US007412880B2

(12) United States Patent
Barreiro et al.

(10) Patent No.: US 7,412,880 B2
(45) Date of Patent: Aug. 19, 2008

(54) DEVICE AND METHOD FOR SCREENING A PLANT POPULATION FOR WIND DAMAGE RESISTANCE TRAITS

(75) Inventors: Roberto Barreiro, Johnston, IA (US); Lori Carrigan, Spicer, MN (US); Mohammadreza Ghaffarzadeh, El Macero, CA (US); Daniel M. Goldman, Des Moines, IA (US); Michael E. Hartman, Des Moines, IA (US); David L. Johnson, Johnston, IA (US); Loren Steenhoek, Grimes, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 0 days.

(21) Appl. No.: 11/549,142

(22) Filed: Oct. 13, 2006

(65) Prior Publication Data

US 2007/0125155 A1    Jun. 7, 2007

Related U.S. Application Data

(60) Provisional application No. 60/739,626, filed on Nov. 23, 2005.

(51) Int. Cl.
*A01G 13/08*    (2006.01)
(52) U.S. Cl. ............... 73/170.07; 73/170.01; 73/170.15
(58) Field of Classification Search .............. 73/170.07, 73/170.01, 170.15
See application file for complete search history.

(56) References Cited

U.S. PATENT DOCUMENTS 3,067,541 A    12/1962    Smith 4,501,089 A  *  2/1985    Cobden ............................ 47/2
4,753,034 A  *  6/1988    Brown ............................. 47/2

(Continued)

FOREIGN PATENT DOCUMENTS

FR    2 777 738 A1    10/1999

(Continued)

OTHER PUBLICATIONS

Baker; "The Development of a Theoretical Model for the Windthrow of Plants" *Journal of Theoretical Biology*, 1995, vol. 175, 355-372, Academic Press Limited.

(Continued)

*Primary Examiner*—Andre J. Allen
(74) *Attorney, Agent, or Firm*—Alston & Bird LLP

(57) ABSTRACT

A device and method for applying a wind force to a plurality of plants in an agricultural environment is provided to screen for selected wind-resistance traits in the plurality of plants. In one embodiment of the present invention, a device is provided including a generating device for creating a moving fluid stream to provide the wind force, a directing device, such as a duct and/or movable vane, for precisely and selectively directing the wind force towards a portion of at least one plant, and a controller for adjusting one or more parameters of the fluid stream. The device and/or method embodiments of the present invention may thus be used to selectively apply the wind force to one or more plants (or portions thereof) such that the plants may be evaluated with respect to one or more wind-resistant physical characteristics.

47 Claims, 19 Drawing Sheets

U.S. PATENT DOCUMENTS

| | | | |
|---|---|---|---|
| 4,838,761 A | * | 6/1989 | Sheppard ................ 416/170 R |
| 5,244,346 A | | 9/1993 | Fergusson |
| 6,505,146 B1 | | 1/2003 | Blackmer |

FOREIGN PATENT DOCUMENTS

| | | | |
|---|---|---|---|
| JP | 2004052709 A | * | 2/2004 |

OTHER PUBLICATIONS

Baker et al.; "A Method for the Assessment of the Risk of Wheat Lodging" *Journal of Theoretical Biology*, 1998, vol. 194, 587-603, Article No. jt980778, Academic Press Limited.

Berry et al.; "Factors Affecting Lodging".

Berry et al. "Controlling Plant Form Through Husbandry To Minimise Lodging In Wheat" *Field Crops Research*. 2000, vol. 67, 59-81, Elsevier Science B. V.

Carter et al.; "Influence of Simulated Wind Lodging On Corn Growth And Grain Yield" *Journal of Prod. Agric.*, 1988, vol. 1, No. 4, 295-299.

Ciolo et al.; "Azione Del Vento Su Piante Di Girasole E Di Mais: Modelli Matematici E Programmi Di Simulazione" *Rivista-di-Ingegneria-Agraria*, 1989, vol. 20, No. 4, 202-209.

Elmore et al.; "Mid-Season Stalk Breakage in Corn: Hybrid and Environmental Factors" *J. Prod. Agric.*, 1999, vol. 12, No. 2, 293-299.

England et al.; "A Dynamic Analysis of Windthrow of Trees" *Forestry*, 2000, vol. 73, No. 3, 225-237.

Ennos et al.; "The Anchorage Mechanics of Maize, Zea Mays" *Journal of Experimental Botany*, 1993, vol. 44, No. 258, 147-153, Oxford University Press.

Ennos; "The Mechanics of Root Anchorage" *Advances in Botanical Research Incorporating Advances In Plant Pathology*, 2000, vol. 33, 133-157. Academic Press.

Erickson et al.; "Using Remote Sensing To Detect Stand Loss And Defoliation In Maize" *Proceedings of the Fifth International Conference On Precision Agriculture*, 2000.

Erickson et al.; "Using Hyperspectral Analysis To Quanitfy Weather-Induced Crop Damage" *Paper Presented at the 2nd European Conference on Precision Agriculture, Odense, Denmark*, 1999, Sheffield Academic Press, Sheffieled, U.K.

Farquhar et al.; "Relative Safety Factors Against Global Buckling, Anchorage Rotation, and Tissue Rupture In Wheat" Journal Of Theoretical Biology, 2001, 211, 55-65. Academic Press.

Farquhar et al.; "The Kinematics Of Wheat Struck By A Wind Gust" *J. Appl. Mech.-Trans.*, 2000, vol. 67, No. 3, 496-502, ASME.

Farquhar et al;. "Competing Effects of Buckling and Anchorage Strength On Optimal Wheat Stalk Geometry" Journal of Biomechanical Engineering, 2002, vol. 124, 441-449, ASME.

Finnigan et al;. "Modelling Waving Crops In a Wind Tunnel" *Boundary-Layer Meteorology*, 1978, vol. 14, 253-277, D. Reidel Publishing Company, Holland.

Finnigan; "Turbulence In Waving Wheat" *Boundary-Layer Meteorology*, 1979, vol. 16, 213-236, D. Reidel Publishing Comapny, Holland and USA.

Fredericksen et al.; "Testing Loblolly Pine Wind Firmness With Simulated Wind Stress" *Canadian Journal of Forest Research*, 1993, vol. 23, No. 9, 1760-1765.

Godin; "Representing and Encoding Plant Architecture: A Review" *Ann. For. Sci*, 2000, Vol. 57, Nos. 5-6, 413-438, INRA, EDP Sciences.

Kato; "Relationship Between Root Lodging and Five Nondestructively-Determined Traits In Maize" *Maydica*, 1998, vol. 43, 65-74.

Koinuma et al.; "Environmental Effects On Two Nondestructive Root Lodging Related Indicators and Correlatiosn Between Hybrids And Parental Inbred Lines In Maze" *Maydica*, 1999, vol. 44, 167-174.

Meisinger et al.; "Construction and Validation of Small Mobile Wind Tunnels for Studying Ammonia Volatilization" *Applied Engineering in Agriculture*, vol. 17, No. 3, 375-381, American Society of Agricultural Engineers.

Moentono; "Identification Of Parental Inbred Lines For Use In Stalk Lodging Resistant Corn Hybrids" *Indonesian Journal of Crop Science*, 1992, vol. 7, No. 1, 19-30.

Niklas et al.; "Evolutionary Trends In Safety Factors Against Wind-Induced Stem Failure" American Journal of Botany, 2001, vol. 88, No. 7, 1266-1278.

Niklas; "Computing Factors of Safety Against Wind-Induced Tree Stem Damage" *Journal of Experimental Botany*, Apr. 2000, vol. 51, No. 345, 797-806.

Saunderson et al.; "Dynamic Model of the Behaviour of Sitka Spruce In High Winds" Journal of Theoretical Biology, 1999, vol. 200, 249-259.

Speck et al.; "Contributions to the Biomechanics of Plants. I. Stabilities of Plant Stems with Strengthening Elements of Different Cross-Sections Against Weight and Wind Forces" Botanica Acta, 1990, vol. 103, 111-122.

Watson; "Wind-Induced Forces In The Near-Surface Lateral Roots of Radiata Pine" Forest Ecology and Management, 2000, vol. 135, 133-142, Elsevier Science B.V.

Zebrowski; "Dynamic Behaviour Of Inflorescence-Bearing Triticale and Triticum Stems" Planta, 1999, vol. 207, 410-417.

"Water Engineering and Environmental Management: The Lodging of Wheat in High Winds," <http://www.iem.bham.ac.uk/environmental/wind/sterling.htm>.

International Search Report and Written Opinion for PCT/US2006/040351, mailed Feb. 1, 2007.

"Treat 'Em Rough," *Pioneer® Corn Profits*, Fall 1967, pp. 1-3.

* cited by examiner

```
START
  ↓
Generating a Moving Air Stream
to Provide a Simulated Wind Force                    — 910
  ↓
Directing the Moving Air Stream Towards a
Portion of at Least one of a Plurality of Plants     — 920
  ↓
Controlling at Least one Parameter of the Moving
Air Stream so as to Evaluate at least one of the     — 930
Plurality of Plants with Respect to a Wind
Resistant Physical Characteristic
  ↓
Locating a Geographical Location of at least One
of the Plurality of Plants in order to Map the       — 1210
Geographical Location of the Application
of the Simulated Wind Force
  ↓
END
```

Fig. 12

DEVICE AND METHOD FOR SCREENING A PLANT POPULATION FOR WIND DAMAGE RESISTANCE TRAITS

CROSS-REFERENCE TO RELATED APPLICATIONS

This application claims the benefit of U.S. Provisional Application No. 60/739,626, filed Nov. 23, 2005, which is incorporated by reference herein in its entirety.

FIELD OF THE INVENTION

The present invention relates generally to a device and method for screening crop plants for stalk strength, root lodging, and/or other wind damage resistance traits by selectively applying wind forces to stands of plants in an agricultural environment. More particularly the device and method of the present invention allows for the selective application of measured forced air streams to a plant in order to identify, from a plant population being cultivated in an agricultural environment, plants that may be more tolerant or unacceptably susceptible to damage from selected wind conditions. Embodiments of the present invention may also allow for the precise application of simulated wind conditions on a group, row, and/or other plant grouping so as to screen the plant grouping for individual plant phenotypes that may be resistant to a selected type of wind-induced damage.

BACKGROUND OF THE INVENTION

Some crop plants, such as corn, are often grown on flat, open agricultural plots that are especially susceptible to potentially damaging winds. There are a number of different failure mechanisms by which plants may be injured or perish when subjected to damaging winds. For example, it is known that in some regions of the world, such as in the western plains of the United States, corn plants are subjected to violent thunderstorms with wind gusts that sometimes result in the sudden breakage of the stalks at the nodes of corn plants (brittle snap). Furthermore, more geographically-widespread failure mechanisms for crop plants, such as corn, include: a lack of adequate root strength (root lodging); a lack of adequate abiotic stalk strength (stalk lodging); and/or a lack of disease resistance in order to withstand strong wind events. Other crops including soybeans, forages, sorghum and small grains are also susceptible to wind events which limit harvestable yields for farmers. Agricultural researchers have, for many years, sought to selectively breed plants having a variety of desirable standability characteristics including, for example, resistance to damage from harsh environmental conditions, such as damaging winds which occur in the presence or absence of thunderstorms during the plants' growing season.

While much research has been performed to study and document the natural occurrence of stalk failure, root lodging failures, and brittle snap in a variety of different crop plants, there has been little emphasis on the development of devices and methods for precisely applying simulated wind forces to crop plants in an agricultural environment to more accurately screen for wind-resistance traits in such crop plants. The general application of wind machines in an agricultural environment is known for preventing frost damage to vulnerable crops, such as citrus trees. Such wind machines, however, are often positioned to circulate warm air lying above the height of the crop plants and above the thermal inversions that tend to cause frost conditions and are unsuitable for generating moving air streams to exert simulated wind forces on plants. The primary use for wind on agricultural crops has been the delivery of herbicides and pesticides to control weeds or insects with sprayers. Furthermore, some experiments have been performed to subject crops to wind forces in order to assess overall wind resistance. For example, the assignee of the present invention has utilized an aircraft engine and propeller assembly to exert wind forces on a row of plants being cultivated in a field. While the engine and propeller assembly may be used to roughly ascertain the strength of the plants' root system in the face of constant gale force (70 miles per hour, for example) wind (by measuring how far down the row that individual plants were uprooted and/or blown over), the engine and propeller assembly does not enable an operator to effectively replicate highly variable wind forces that occur in storms and may lead to brittle snap, lodging, and other crop plant standability failure mechanisms. Thus, while some data exists to suggest what types of subtle changes in wind forces may induce brittle snap, stem, stalk, and/or root failure, no device or method is known for accurately reproducing wind forces for selecting plants in the field that may be resistant to such forces. The precise generation and application of wind forces having a variety of variable parameters is crucial for identifying and selecting individual plants that are particularly resistant to failure in response to an applied wind force. Accurate selection of such individuals may be important for hybridization and/or genotyping activities in the pursuit of more wind-resistant crop varieties.

Thus in order to facilitate the application of wind forces to a plant population for the precise identification of individual plants that may be resistant to failure mechanisms that are linked to wind forces having specific parameters, there is a need in the art for a device and method that allows for generation of wind forces and the control of the parameters of such forces as they are applied to crop plants in an agricultural environment. Furthermore, there exists a need for a device that is reliably operable and mobile in a variety of agricultural environments such as muddy fields, mature cornfields, and other environments. There also exists a need for a device that may be capable of mapping and/or storing the location of the application of wind forces having specific parameters. There further exists a need for a device that may be quickly and efficiently advanced through a field that may contain a variety of research plots containing a corresponding variety of crop plant hybrids.

SUMMARY OF THE INVENTION

The embodiments of the present invention satisfy the needs listed above and provide other advantages as described below. Embodiments of the present invention may include a device for applying a measurable and uniform wind force to a plurality of plants in an agricultural environment. According to some embodiments, the device may be adapted to be carried by a vehicle for moving the device relative to the plurality of plants. In some embodiments, the device itself may also comprise a specialized vehicle for moving the various device components relative to the plurality of plants. In some embodiments, the device comprises a generating device carried by the vehicle for generating a moving fluid stream providing the wind force; a directing device in fluid communication with the generating device for directing the moving fluid stream toward a portion of at least one of the plants; and a controller in communication with the generating and directing devices for controlling at least one parameter of the moving fluid stream. Thus, using the various embodiments of the present invention, at least one of the plurality of plants may be evaluated with respect to a wind-resistant physical characteristic (such as superior stem, root lodging, and brittle snap characteristics).

In various device embodiments of the present invention, the generating device may comprise at least one of: a turbine, a fan, a propeller, an impeller device, and/or a combination of such generating devices. Furthermore in some device embodiments, the generating device may be adapted to be capable of providing and intermittent and/or pulsed fluid stream at a selected pulse frequency. The directing device of the present invention may comprise, in some embodiments, a duct configured to direct the moving fluid stream from an outlet of the directing device towards a selected portion of at least one of the plurality of plants (such as the upper stem, and or root/stem interface).

In some such embodiments, the duct may further comprise at least one movable vane for adjusting at least one parameter of the moving fluid stream. According to some additional embodiments, the duct may define at least one outlet aperture. In such embodiments, the device may further comprise at least one air-permeable barrier operably engaged with the duct, wherein the barrier defines a plurality of openings configured to subdivide the outlet aperture so as to adjust the at least one parameter of the moving fluid stream. The parameters of the moving fluid stream generated, directed, and/or controlled by embodiments of the present invention may include, but are not limited to: a velocity of the moving fluid stream; a direction of the moving fluid stream; a height of the moving fluid stream; angle of the fluid stream; a pulse frequency of the moving fluid stream; plant exposure time to the fluid stream; and combinations of the parameters listed above.

According to other device embodiments of the present invention, the device may further comprise a locator device in communication with the controller for locating a geographical location of at least one of the plurality of plants in order to map the location of the application of a particular simulated wind force within the agricultural environment. Furthermore, the device embodiments of the present invention may also comprise a memory device in communication with said controller for storing data related to the applied wind force and the agricultural environment. Such data may include, but is not limited to: a geographical location of at least one of the plurality of plants; a parameter of the moving fluid stream; a characteristic (such as species, hybrid designation, or genetically-modified organism (GMO) designation) of at least one of the plurality of plants; and/or a combination of such data types. Furthermore, according to some device embodiments, the controller of the present invention may comprise a personal computer, microprocessor, and/or combinations thereof.

As described generally above, some device embodiments of the present invention may also comprise a specialized vehicle for moving the device relative to the plurality of plants. According to some embodiments, the vehicle may comprise at least one of: a tractor; a tracked vehicle; a cart adapted to be advanced on one or more rails; a combine; a four-wheel drive vehicle; a trailer; and/or combinations thereof. Furthermore, the vehicle may comprise a frame operably engaged with the generating device, the directing device and the controller, and at least two parallel rolling elements extending downward from the sides of the frame such that said frame may be supported above the plurality of plants as the vehicle is moved relative to the plants. The rolling elements may comprise, for example, wheels, wheel and track assemblies, and combinations of these or other rolling elements. In some other embodiments, the vehicle may also comprise a cab operably engaged with the frame for housing an operator, at least one motor operably engaged with the frame for moving the vehicle relative to the plants, and a plurality of height adjustment devices operably engaged between the frame and the at least two parallel rolling elements such that the frame may be raised or lowered above a maximum height of the plurality of plants. The height adjustment devices may comprise, in various embodiments, hydraulic actuators, pneumatic actuators, and/or combinations of such devices. Some device embodiments may also comprise an adjustable subframe operably engaged between the generating device, the directing device, the controller, and the frame, wherein the adjustable subframe may be raised or lowered in relation to the frame such that the fluid stream generating, directing, and controlling components of the present invention may be raised and lowered in relation to the plurality of plants. According to various device embodiments, the controller of the present invention may be in communication with the plurality of height adjustment devices and/or the adjustable subframe for controlling the height and/or configuration of the frame and/or subframe.

The embodiments of the present invention also provide a method for applying a wind force to a plurality of plants in an agricultural environment such that the plants may be evaluated with respect to a wind-resistant physical characteristic, such as, for example, resistance to stalk brittle snap and positive stalk and root lodging characteristics. One method embodiment of the present invention comprises the following steps: generating a moving fluid stream providing a wind force; directing the moving fluid stream towards a portion of at least one of a plurality of plants; and controlling at least one parameter of the moving fluid stream such that the at least one of the plurality of plants may be evaluated with respect to a wind-resistant physical characteristic. Furthermore, the method embodiments of the present invention may also comprise providing device components for performing the method steps outlined above, such as, for example, providing a generating device adapted to be capable of being carried by a vehicle for generating the moving fluid stream, providing a directing device in fluid communication with said generating device for directing the moving fluid stream, and providing a controller in communication with said generating device and said directing device for controlling at least one parameter of the moving fluid stream. Some method embodiments of the present invention may further comprise moving the provided generating device, directing device, and controller relative to the plurality of plants. Additional method embodiments further comprise providing a vehicle for carrying the generating device, the directing device, and the controller such that the generating device, the directing device, and the controller may be moved relative to the plurality of plants.

According to some method embodiments, the generating step further comprises generating the moving fluid stream intermittently at a pulse frequency. Furthermore, in some method embodiments, the directing step may further comprise actuating at least one movable vane for adjusting the at least one parameter of the moving fluid stream. The controlling step of the present invention may, in some method embodiments, comprise controlling various parameters of the moving fluid stream, which may include, but are not limited to: a velocity of the moving fluid stream; a direction of the moving fluid stream; a height of the moving fluid stream; angle of the fluid stream; a pulse frequency of the moving fluid stream; plant exposure time to the fluid stream; and combinations of the listed parameters.

Some method embodiments of the present invention further comprise locating a geographical location of at least one of the plurality of plants so as to map the application of the simulated wind force within the agricultural environment. Other method embodiments may also comprise storing data related to the application of the wind force, including, for example, a geographical location of at least one of the plurality of plants, at least one parameter of the moving fluid stream, a characteristic of at least one of the plurality of plants, and/or combinations of such data.

Thus the various embodiments of the device and method of the present invention provide many advantages that may include, but are not limited to: providing a device for generating a precisely controllable fluid stream that provides a simulated wind force that may be applied efficiently to a variety of different plants and plant groupings in a working agricultural research environment, providing a generating device, directing device, and controller for replicating wind conditions that are known to produce certain types of plant failure in commercial agricultural environments in order to be better capable of selecting individual plants exhibiting resistance to such failure modes, and providing the capability of tracking, logging, and/or mapping the application of complex wind forces within an agricultural environment (such as a research plot including stands of various plant hybrids and/or varieties). Some embodiments of the system and method of the present invention provide the added advantage of providing a specialized vehicle for quickly and efficiently applying precisely controllable simulated wind forces to a variety of crop plants in difficult agricultural environments, including, for example, wet, muddy fields, and tall mature stands of corn plants.

These advantages, and others that will be evident to those skilled in the art, are provided in the system, method, and computer program product of the present invention.

BRIEF DESCRIPTION OF THE DRAWINGS

Figure 1:
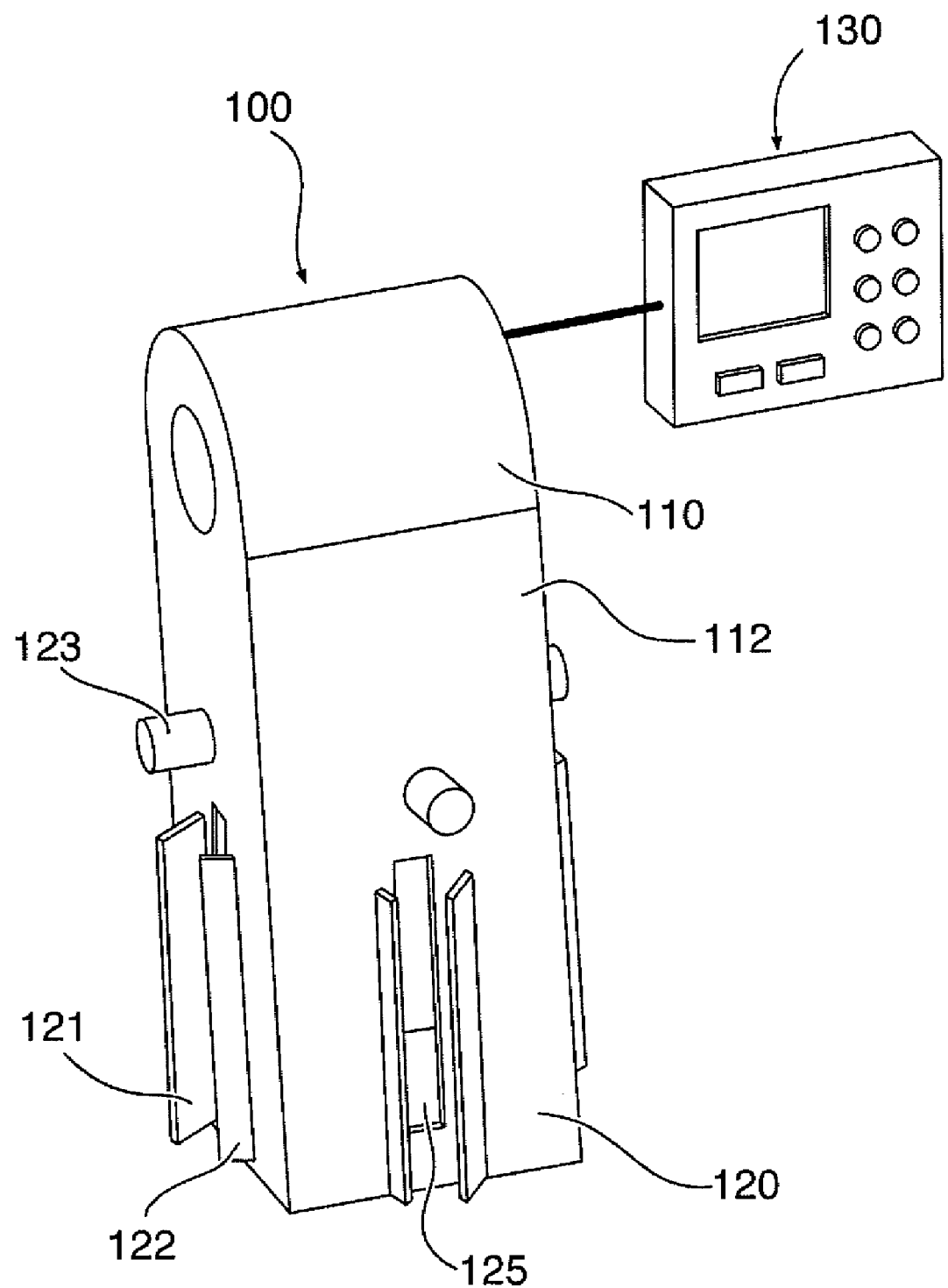

Having thus described the invention in general terms, reference will now be made to the accompanying drawings, which are not necessarily drawn to scale, and wherein:

FIG. 1 shows a perspective view of an exemplary embodiment of the device of the present invention including a generating device, directing device, and controller.

Figure 2:
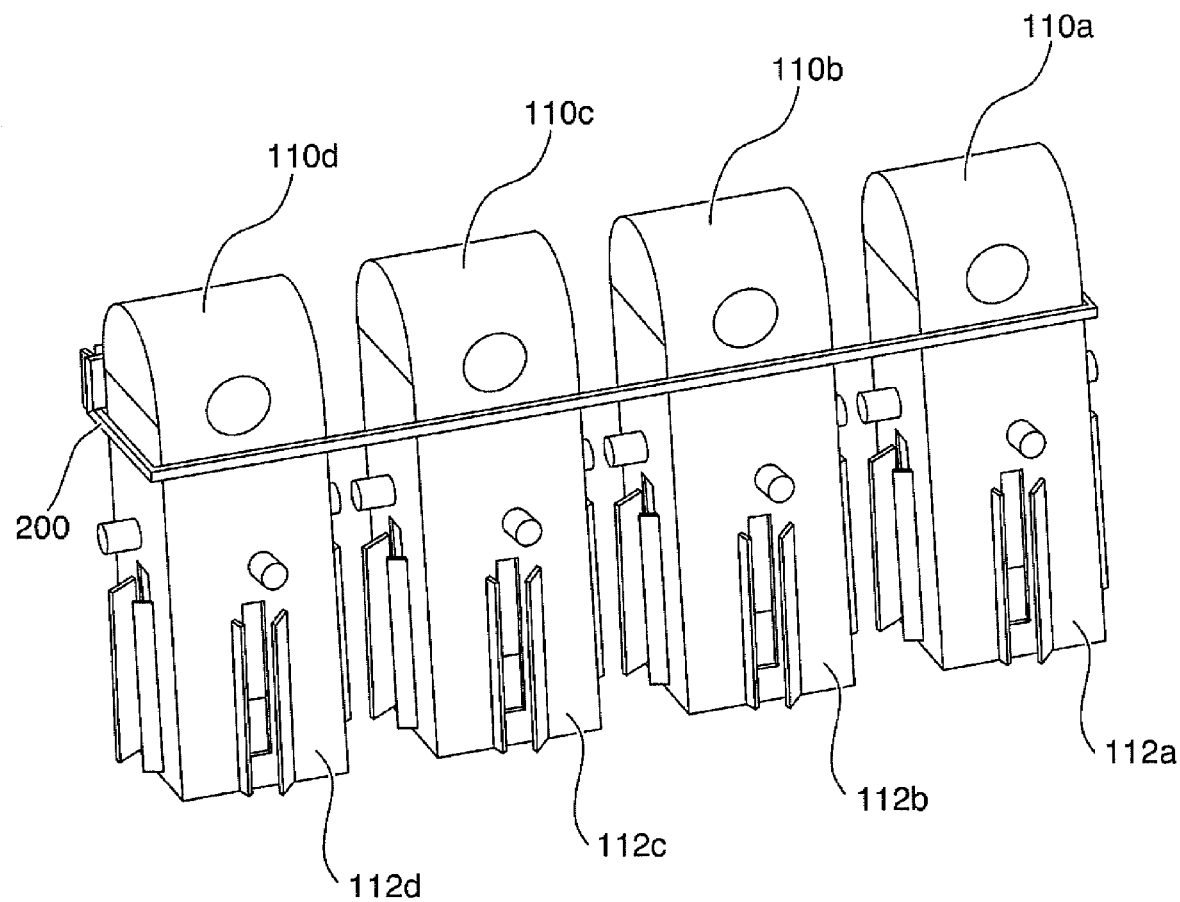

FIG. 2 shows a perspective view of a plurality of generating devices carried by a subframe assembly according to one embodiment of the present invention.

Figure 3:
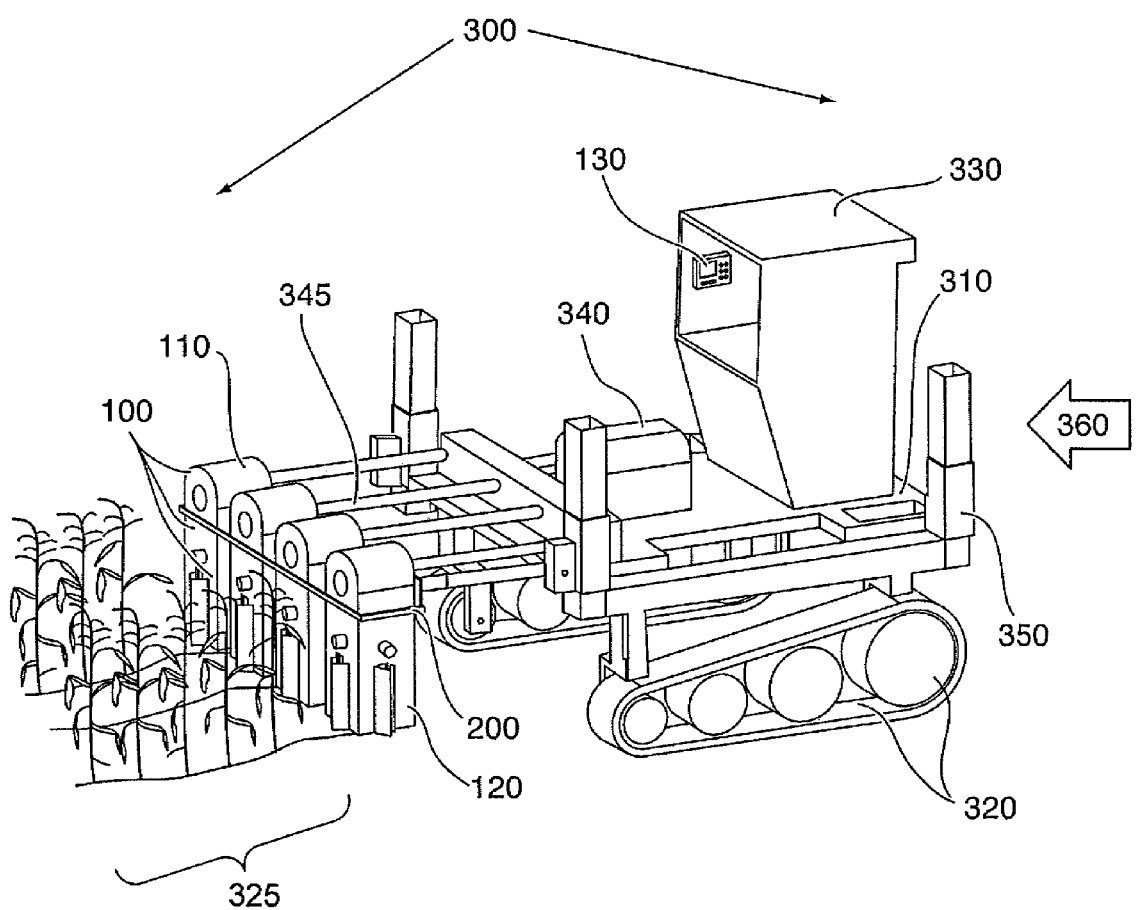

FIG. 3 shows a perspective view of the device embodiment of the present invention, including a vehicle for advancing the generating device, directing device, and controller relative to a plurality of plants in an agricultural environment.

Figure 4:
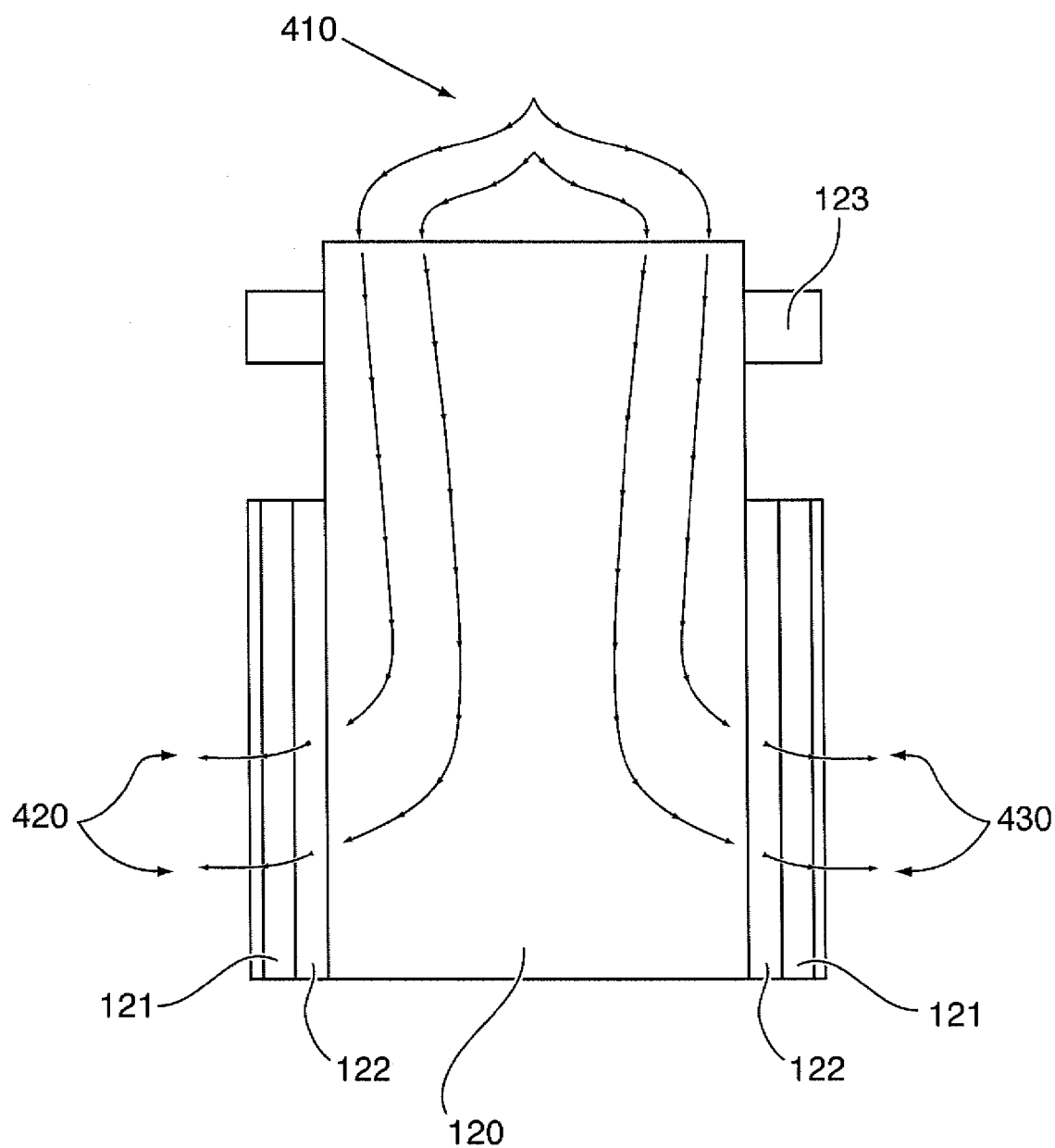

FIG. 4 shows a perspective view of a directing device according to one exemplary embodiment of the present invention.

Figure 5:
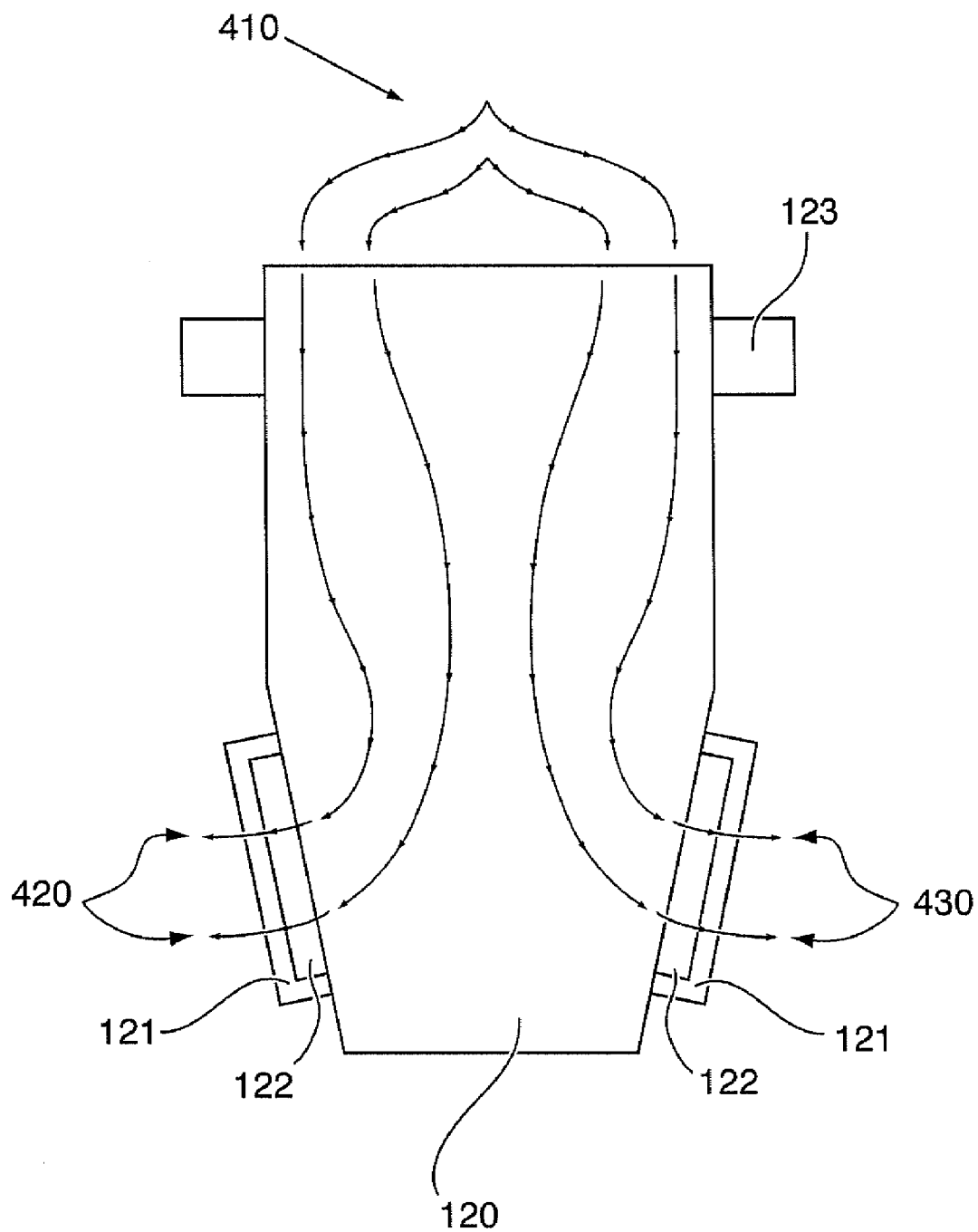

FIG. 5 shows a perspective view of an angled directing device according to one exemplary embodiment of the present invention.

Figure 6:
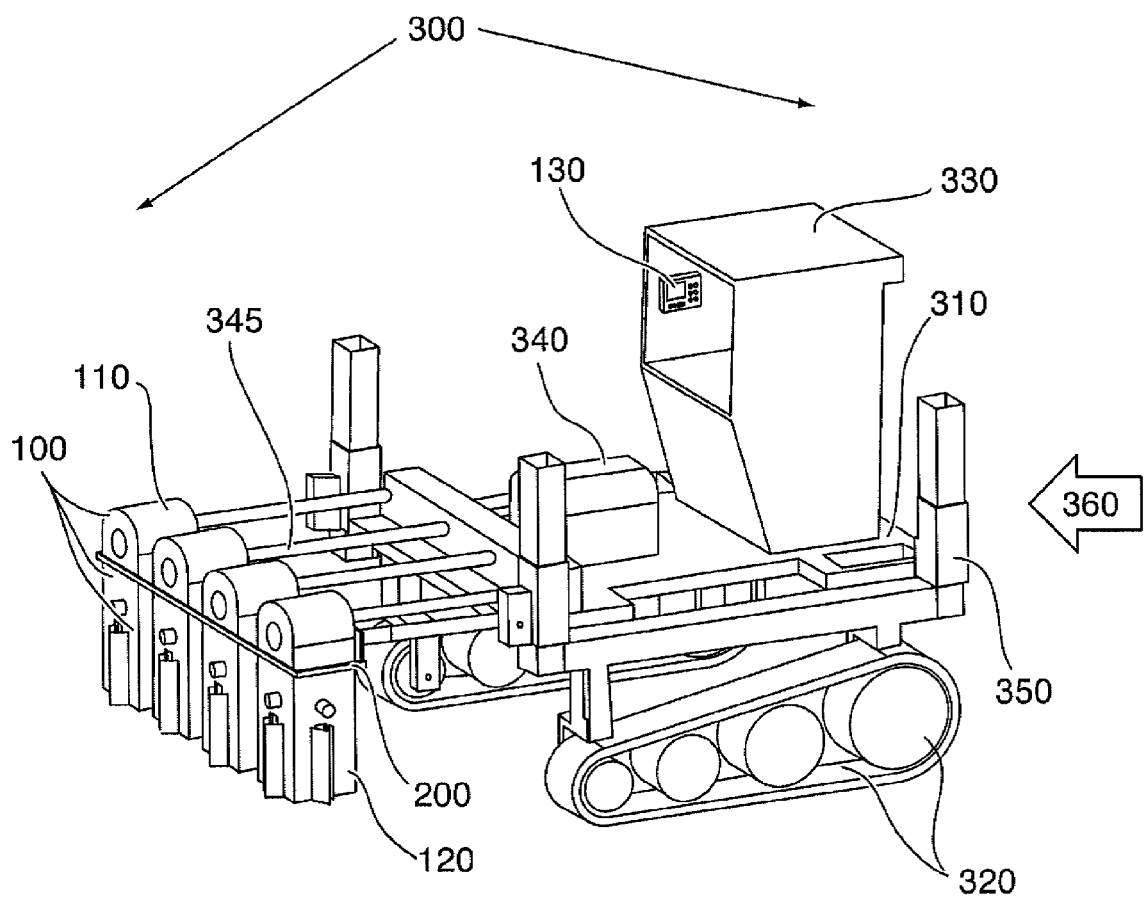

FIG. 6 shows a perspective view of one device embodiment of the present invention including a vehicle, wherein the vehicle frame height is in a lowered configuration.

Figure 7:
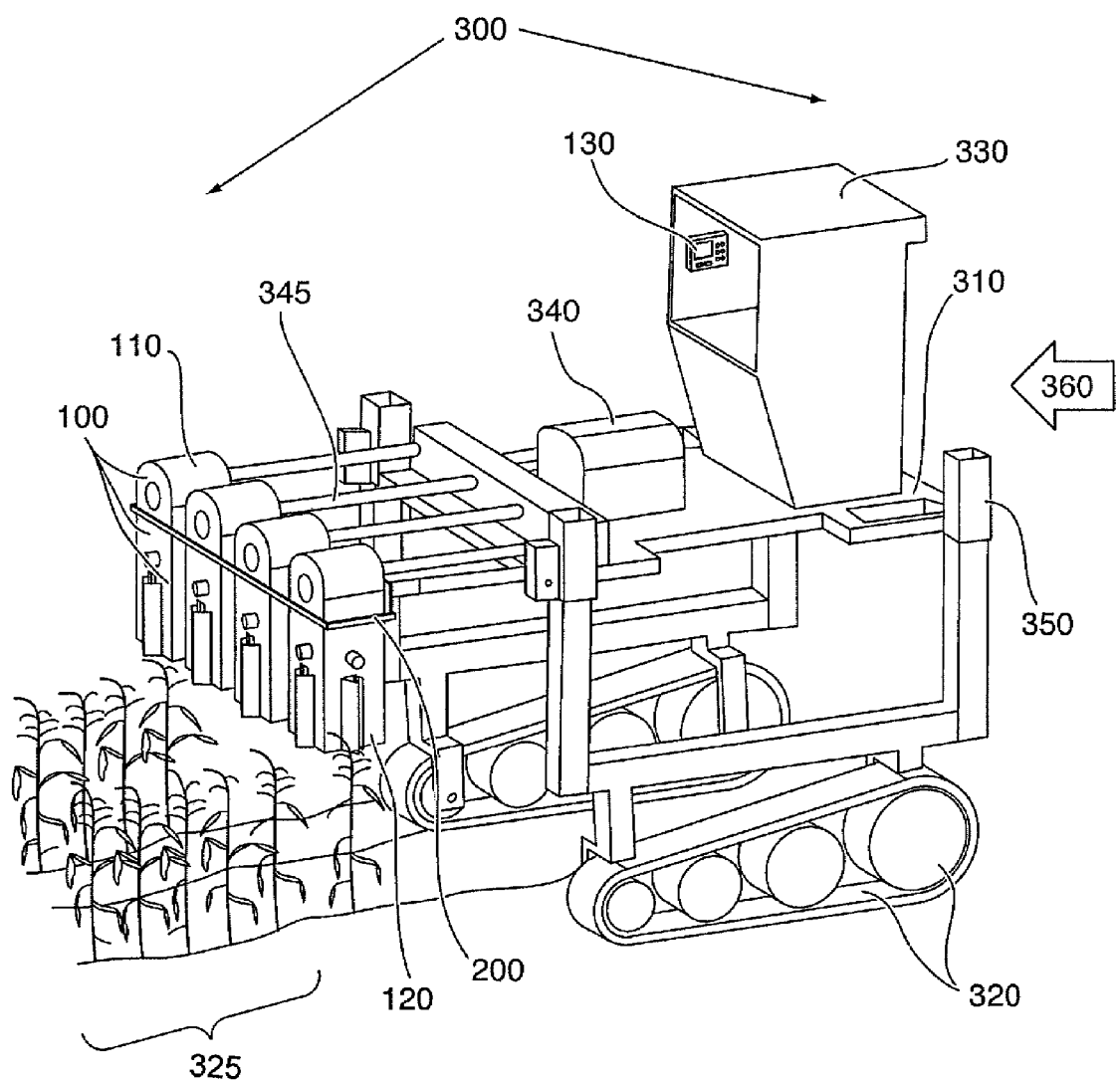

FIG. 7 shows a perspective view of one device embodiment of the present invention including a vehicle, wherein the vehicle frame height is in a raised configuration.

Figure 8:
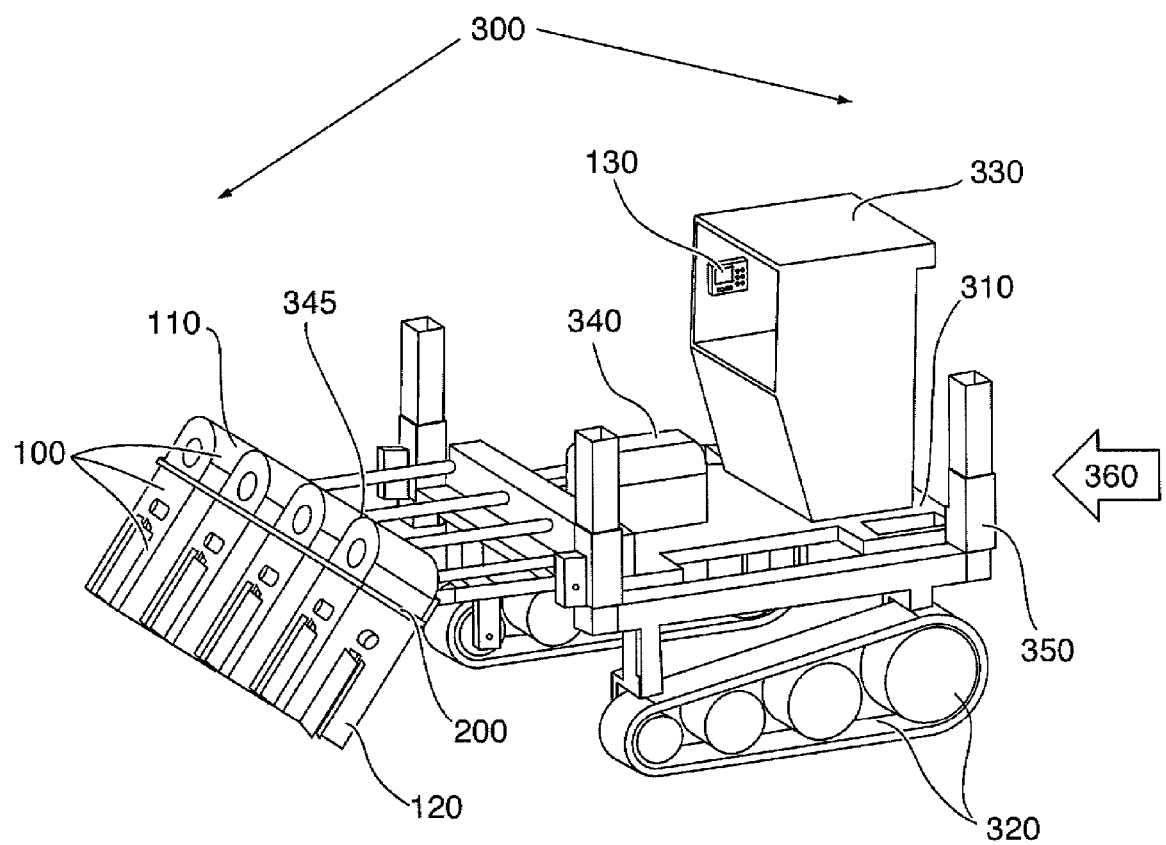

FIG. 8 shows a perspective view of one device embodiment of the present invention including a vehicle, wherein the subframe is in a raised "travel-ready" configuration relative to the vehicle frame.

Figure 9:
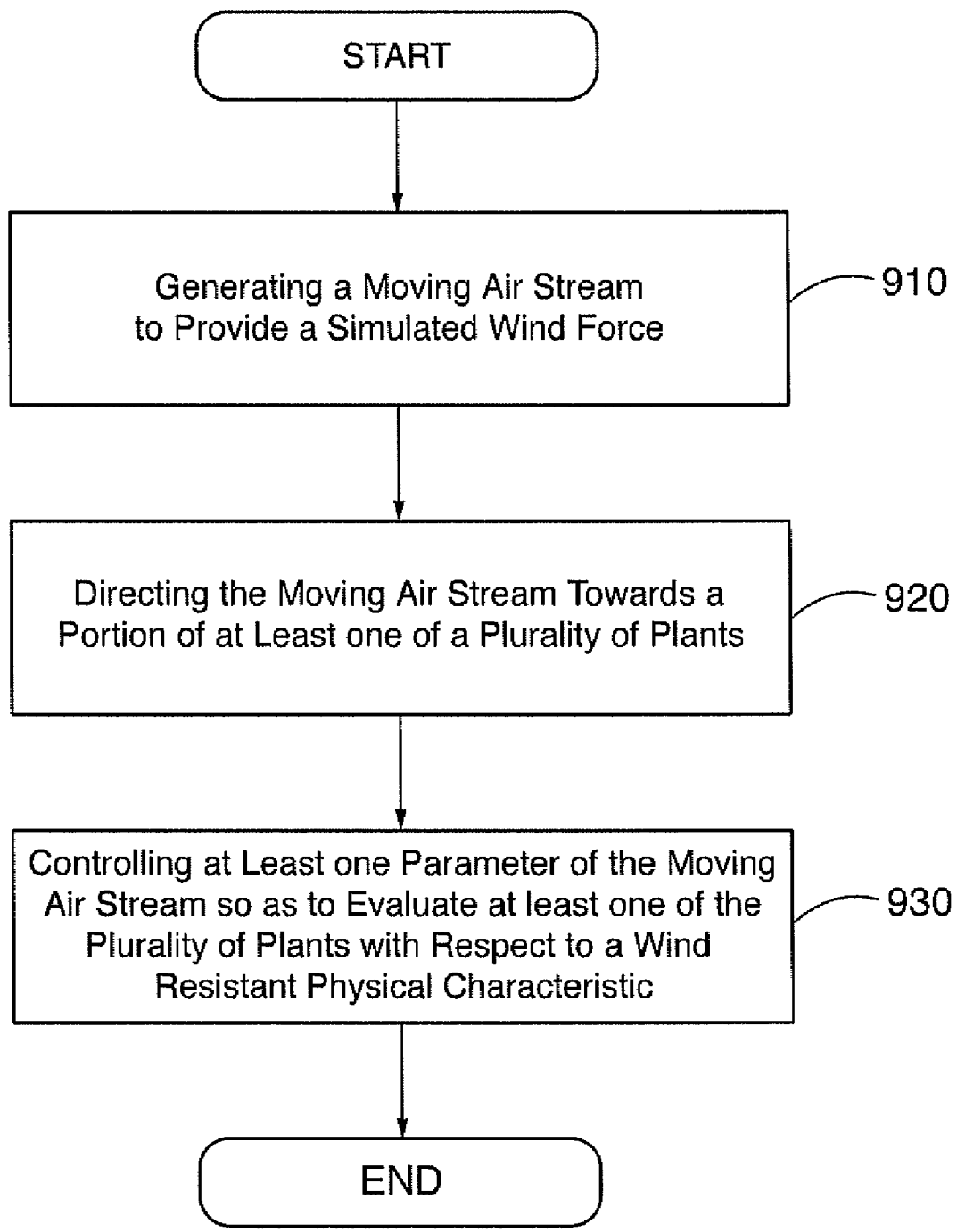

FIG. 9 shows a flow diagram of one embodiment of the method of the present invention including generating, directing, and controlling steps.

Figure 10:
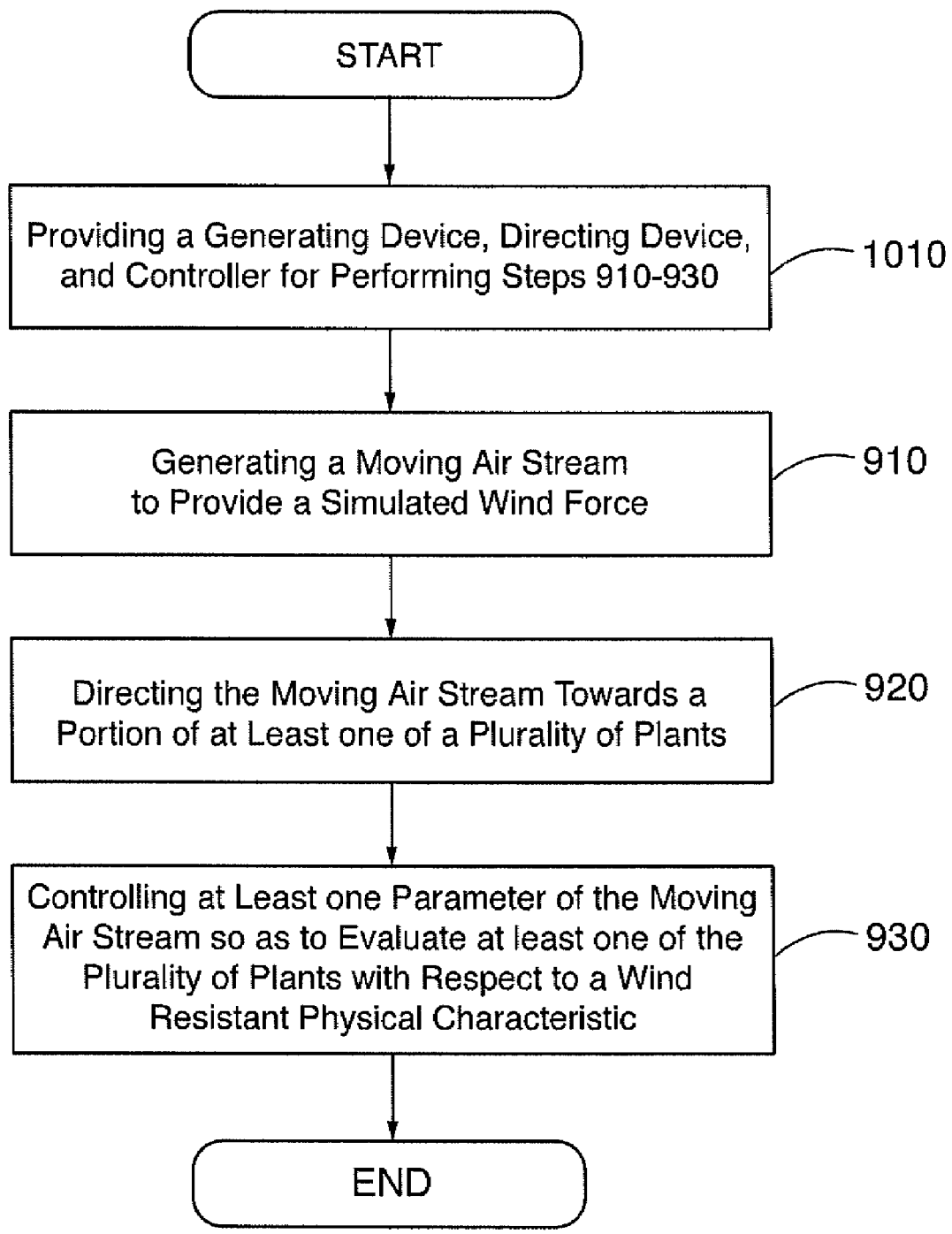

FIG. 10 shows a flow diagram of one embodiment of the method of the present invention further comprising providing a generating device, directing device, and controller for performing the various method steps.

Figure 11:
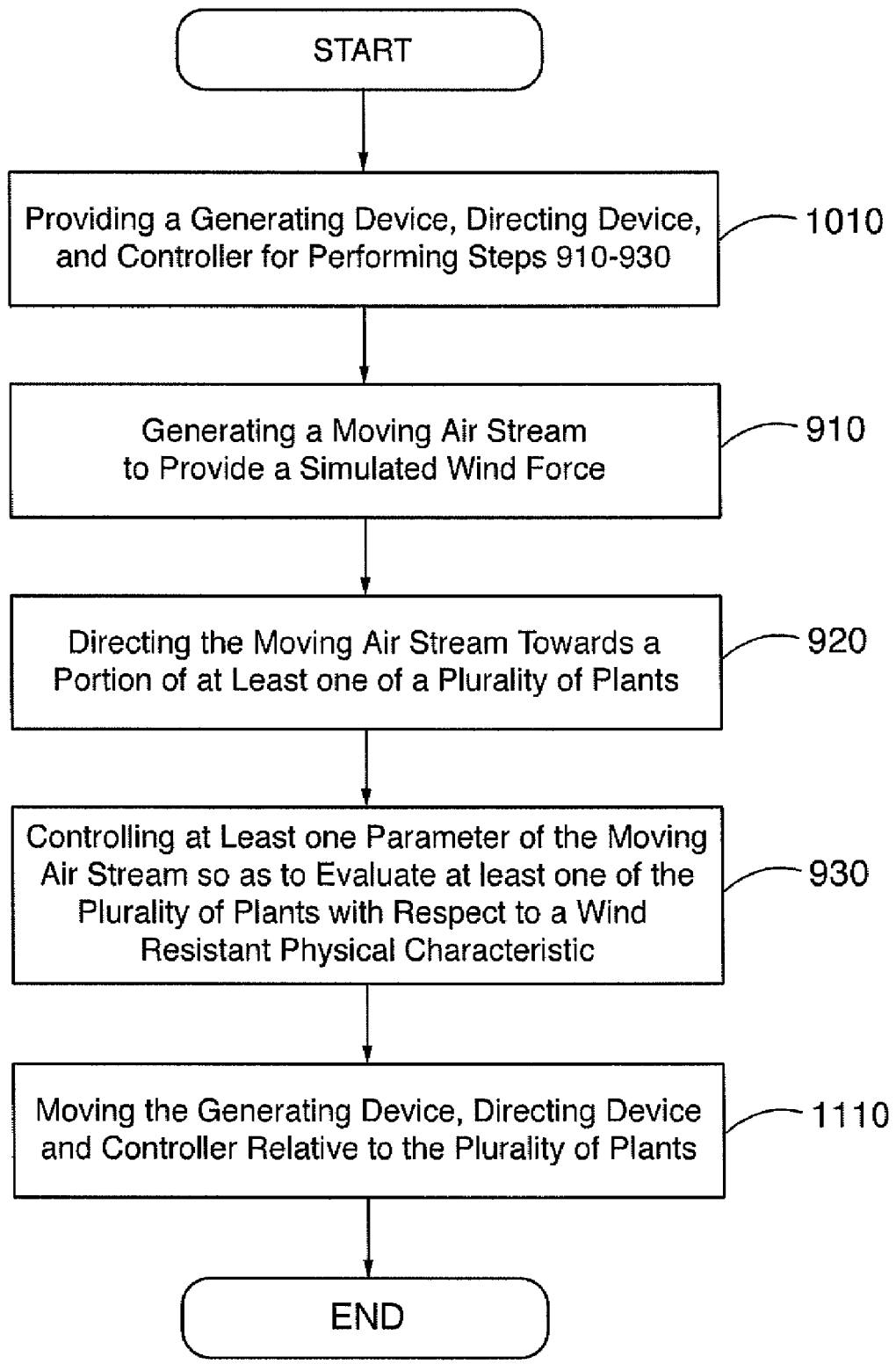

FIG. 11 shows a flow diagram of one embodiment of the method of the present invention further comprising a step for moving the generating device, directing device, and controller relative to a plurality of plants.

FIG. 12 shows a flow diagram of one embodiment of the method of the present invention further comprising a step for locating a geographical location of at least one of the plurality of plants.

Figure 13:
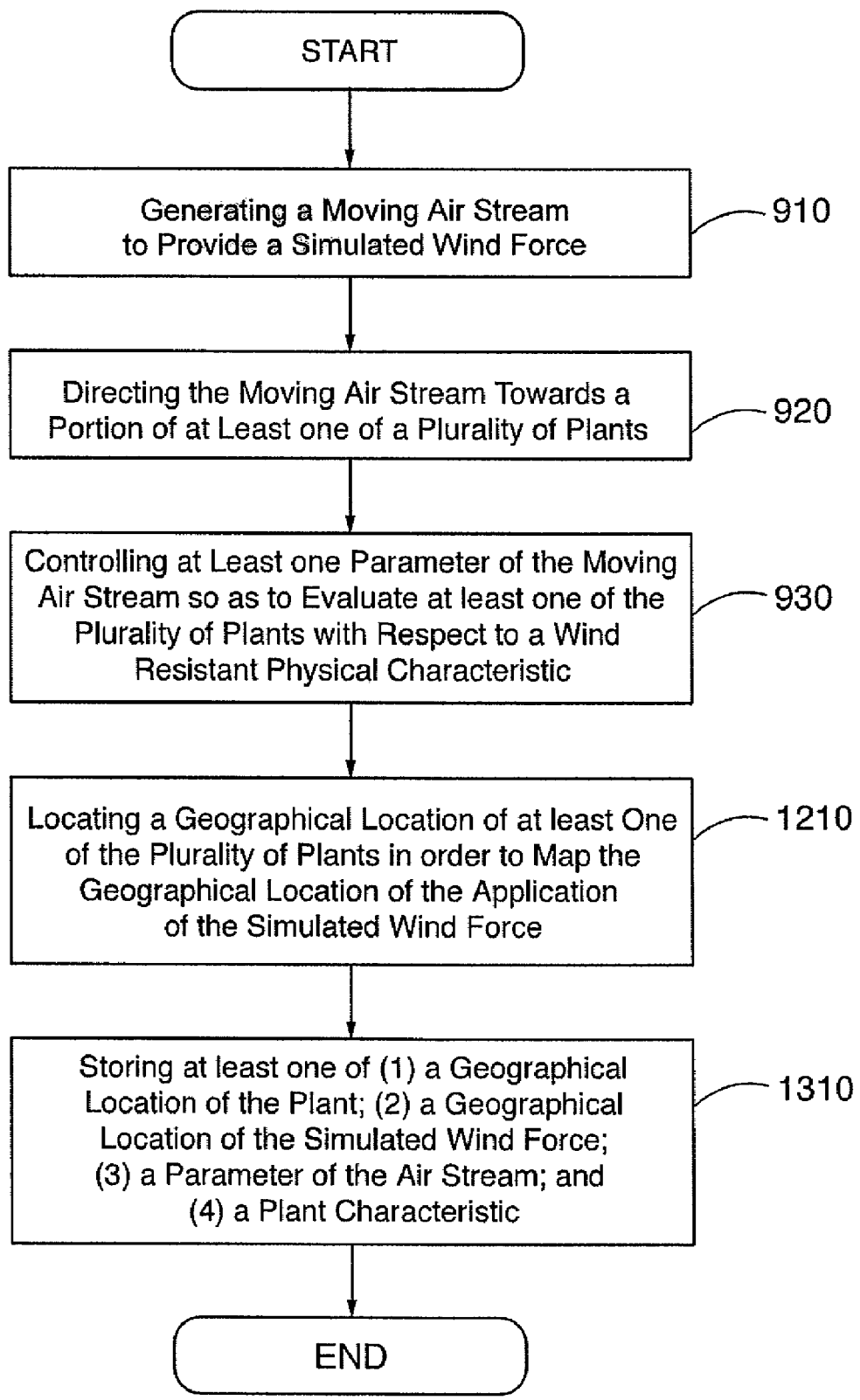

FIG. 13 shows a flow diagram of one embodiment of the method of the present invention further comprising a step for storing data related to at least one of the plurality of plants and/or one or more parameters of the applied wind force.

Figure 14:
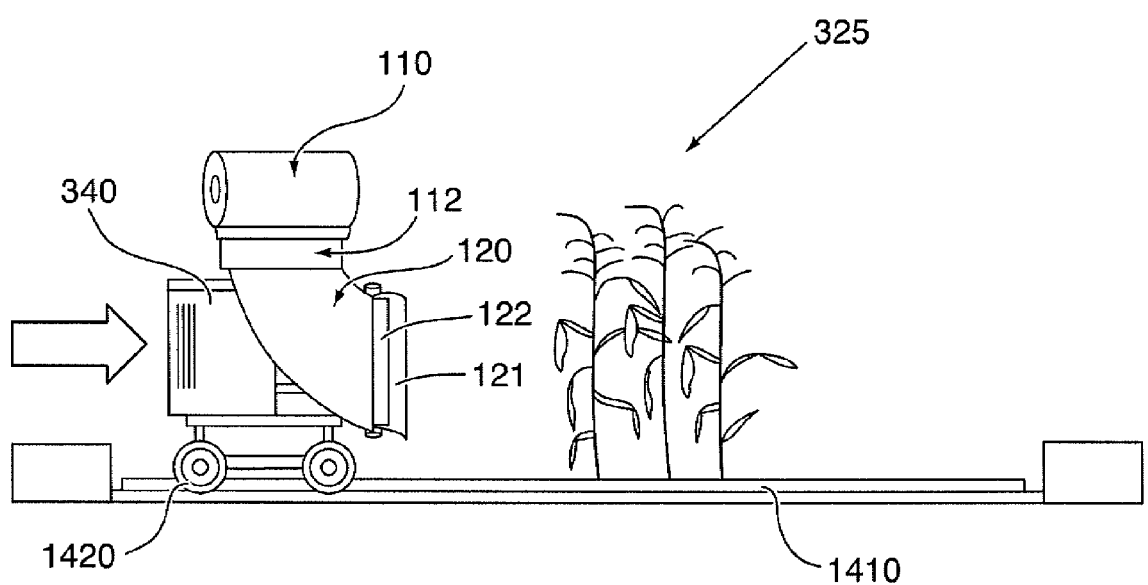

FIG. 14 shows a side view of one device embodiment of the present invention including a cart capable of being advanced on one or more rails relative to a plurality of plants.

Figure 15:
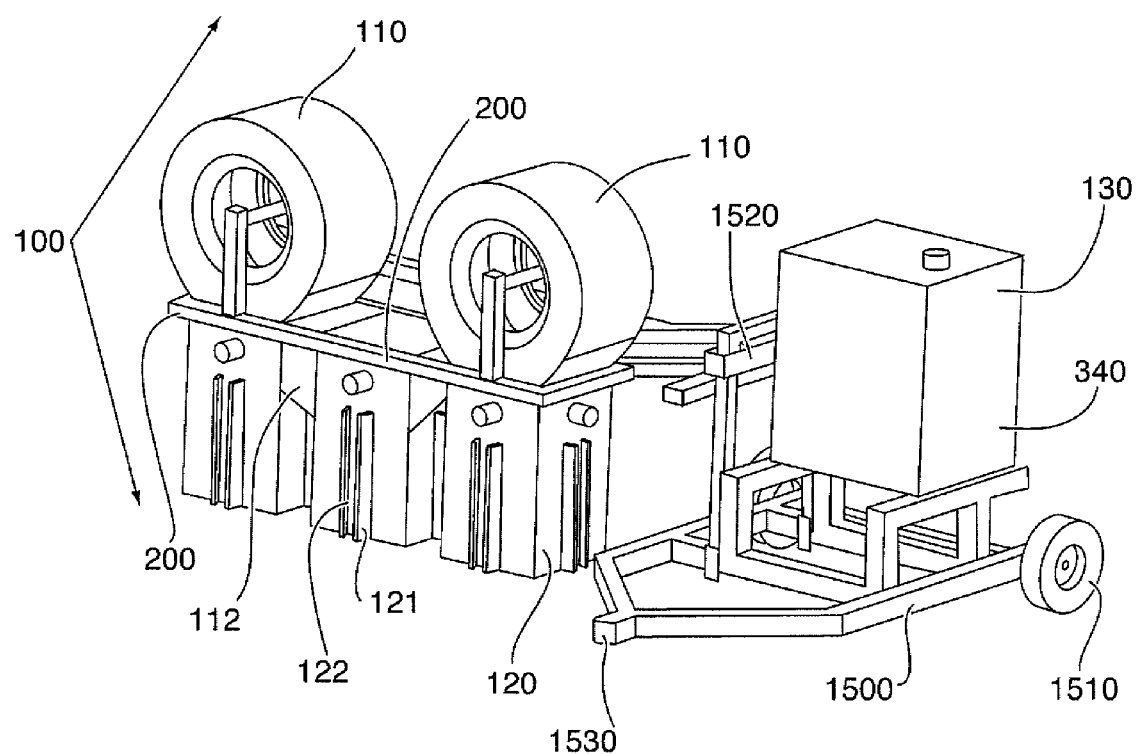

FIG. 15 shows a perspective view of one device embodiment of the present invention including a trailer and an offset frame for suspending the device relative to a plurality of plants.

Figure 16:
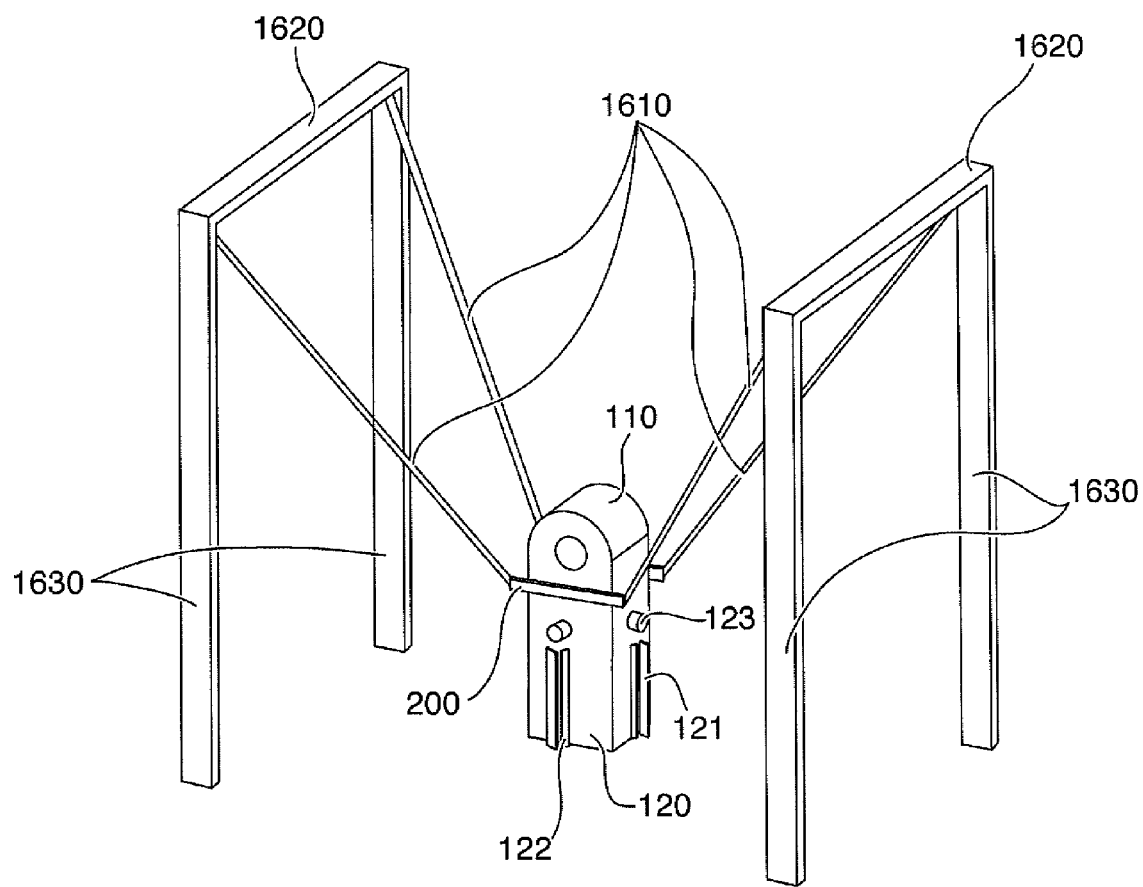

FIG. 16 shows a side view of one device embodiment of present invention including an assembly for suspending the device relative to a plurality of plants relative to an overhead frame and/or suspension line.

Figure 17:
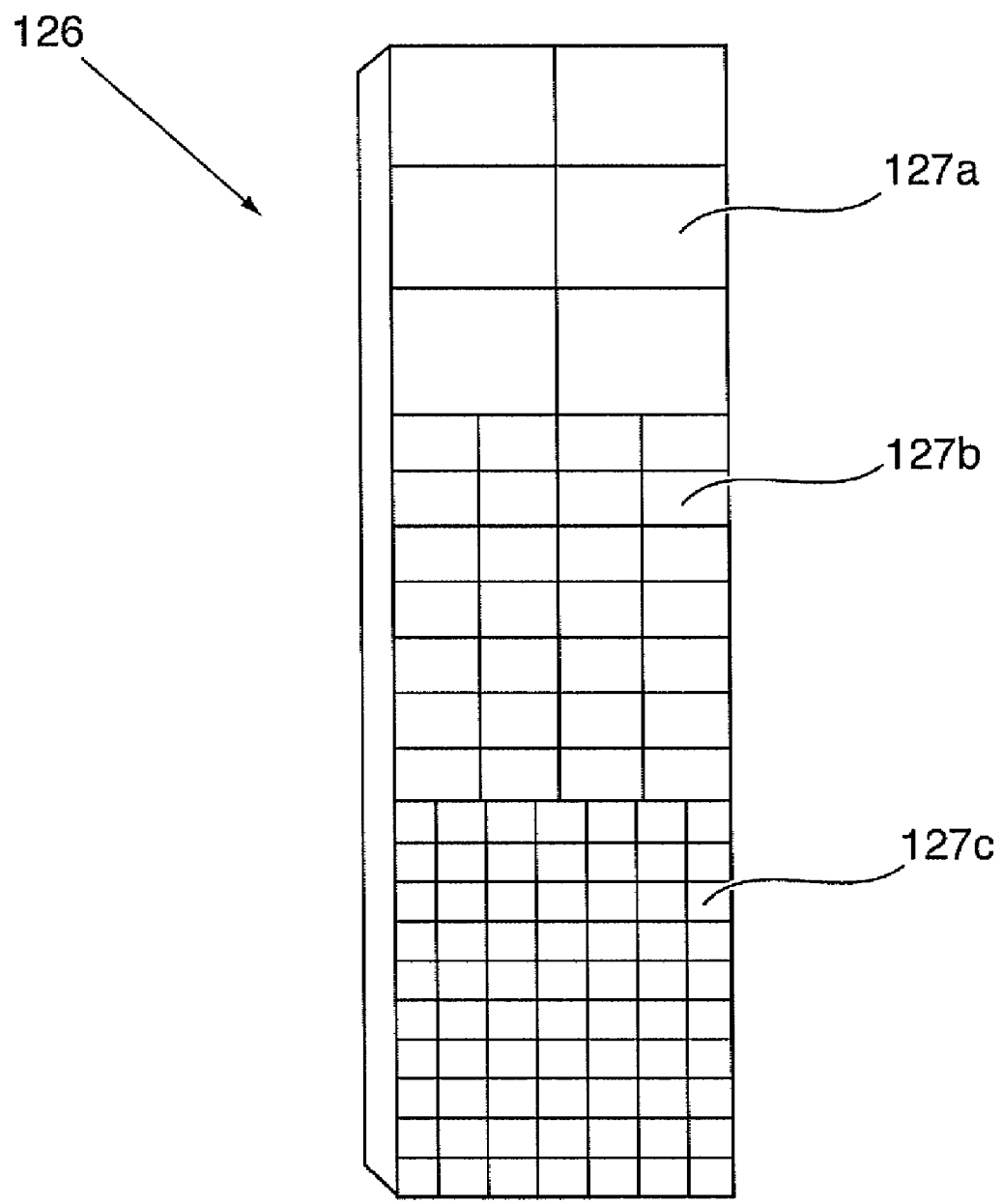

FIG. 17 shows an example of an air-permeable barrier that may be operably engaged with a duct defined by a directing device according to one embodiment of the present invention.

Figure 18:
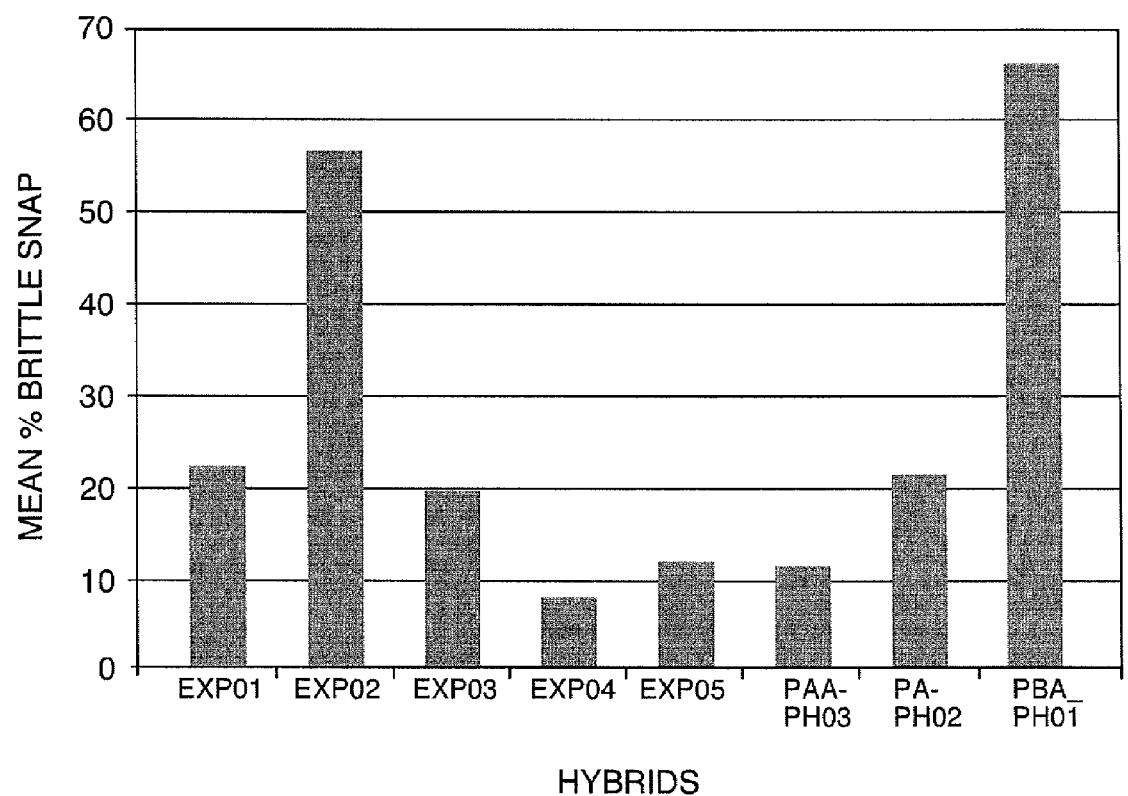

FIG. 18 shows an example of experimental results used to characterize one or more of a plurality of plants with respect to a wind-resistant physical characteristic according to one embodiment of the present invention.

Figure 19:
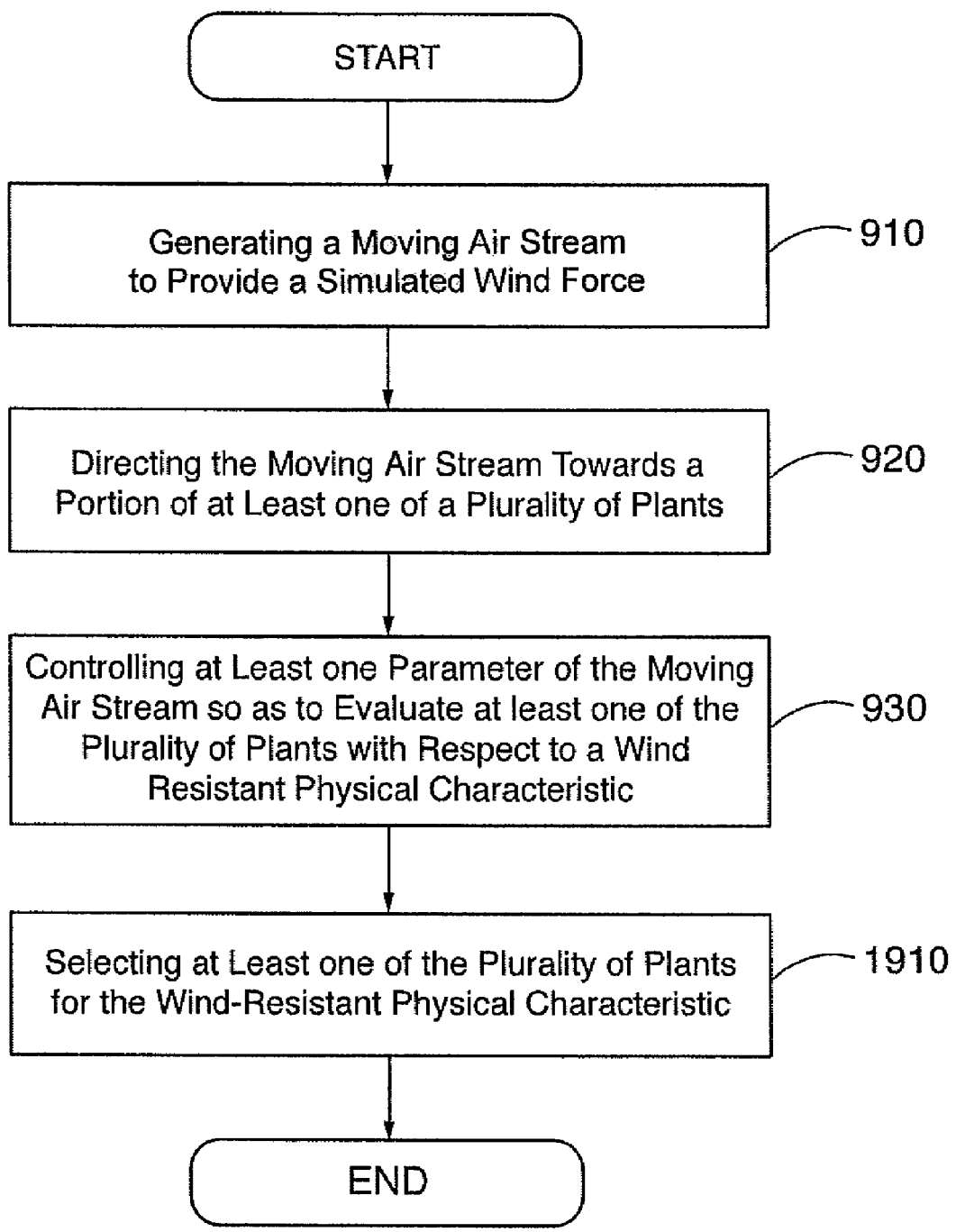

FIG. 19 shows a flow diagram of one embodiment of the method of the present invention including generating, directing, controlling, and separating steps.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While the embodiments of the present invention are described below in the context of an agricultural environment for growing maize plants in rows defining row axes, it should be understood that the embodiments of the present invention may also be used to apply wind forces to other types of plants, which may be cultivated in a variety of configurations and environments. For example, in some embodiments, the device of the present invention may be used to apply wind forces and evaluate wind resistance in a variety of plant species, including, but not limited to: soybeans, forages, small grains, grasses, oil seeds, sorghum, and any other agricultural plants. For example, some embodiments of the present invention may be used to evaluate wind resistance and/or positive standability characteristics in crop plants that may include, but are not limited to: corn, alfalfa, sunflower, Brassica, soybean, cotton, safflower, peanut, sorghum, wheat, millet, tobacco, rice, barley, oats, wheat, sorghum, rye, and sugarcane.

In addition, one skilled in the art will appreciate that the methods of the present invention may also be used to characterize, identify, catalog, and map wind resistance traits of a variety of different plants that may include a variety of crops, native plants, invasive plant species, and or other plants cultivated and/or present in an agricultural environment that may be subject to damage and/or destruction when exposed to specific types of wind forces. It should also be understood that the embodiments of the present invention may be used to apply wind forces to subject one or more plants to a drying air flow so as to simulate drought conditions. Furthermore, some embodiments of the present invention may also be used to apply wind forces to subject one or more plants to remove boundary-layer forming residue and/or moisture from a plant and/or group of plants being cultivated in an agricultural environment. Furthermore, while embodiments of the present invention are described below in the context of an "exhaling" fluid stream that is directed outward from the directing device 120, some embodiments of the present invention may also generate apply a wind force to a plurality of plants in an agricultural environment by drawing air into the directing device 120 (i.e., applying a vacuum force, for example).

FIG. 1 shows one embodiment of the device 100 of the present invention for applying a wind force to a plurality of plants in an agricultural environment, such as a research plot. In some embodiments, the device comprises at least a generating device 110, directing device 120, and a controller 130 for controlling the operation of the device 100. The device 100 may be adapted to be carried by a vehicle 300 (see FIG. 3, for example) for moving the device 100 relative to the plants 325, which may be planted and cultivated generally in a plurality of rows. As shown generally in FIG. 3, the device 100 (and vehicle 300) may be advanced in a first direction 360 which may be generally parallel to one or more rows of plants 325 that may be cultivated in a research plot. Using a directing device 120 (and the movable vanes 121, 122 provided in some embodiments thereof, as described more fully below), the device 100 may be capable of precisely directing a moving fluid stream (such as an air and/or liquid stream creating a corresponding wind force simulating a naturally-occurring wind event, for example) towards one or more of the plants 325 as the device 100 (and/or vehicle 300) is advanced in the first direction 360. Thus, at least one of the plurality of plants 325 may be evaluated with respect to a wind-resistant physical characteristic by determining which individual plants resist a particular type of plant failure mechanism. According to various embodiments of the present invention, the device 100 of the present invention may be utilized to evaluate one or more wind-resistant physical characteristics, which include, but are not limited to: a root lodging factor; a stalk lodging factor; a brittle stem break factor; and other plant characteristics that may be indicative of a particular resistance and/or susceptibility to wind-induced damage or failure.

Various embodiments of the device 100 of the present invention may thus be used for implementing method steps for selecting at least one of the plurality of plants for a particular wind resistant physical characteristic. Furthermore, as described further herein, such a selecting step may further comprise comparing the wind resistant physical trait of the at least one of the plurality of plants to a known wind resistant physical trait of at least one reference plant (for example, a plant hybrid or genetically modified organism (GMO) that is known to exhibit an average wind resistant physical trait). For example, as shown generally in FIG. 18, such reference plants may comprise reference hybrids with below average (PBA), average (PA) and above average (PAA), respectively, predicted brittle snap strength based on a number of data points collected after natural brittle events in the past 10 years. EXP01, EXP02, EXP03, and EXP04, and EXP05 represent at least one of a plurality of experimental plant hybrids which may be characterized for their brittle snap strength in comparison to the reference plants.

According to some embodiments of the present invention the device 100 of the present invention may also be utilized to evaluate one or more specific wind-resistant physical characteristics including, but not limited to: an early season root lodging factor, a late season root lodging factor, and plant standability characteristics as affected by selected insect pests and/or selected disease types. Early season root lodging is defined as root lodging which occurs prior to or at anthesis. Late season root lodging is root lodging which occurs post anthesis through flowering. Stalk lodging in corn can be caused by a number of diseases that may include but are not limited to: Anthracnose stalk rot caused by *Colletotrichum graminicola*, Fusarium stalk rot caused by *Fusarium moniliforme*, Diplodia stalk rot caused by *Diplodia maydis*, Gibberella stalk rot caused by *Gibberella zeae*. Furthermore, some insects infest and burrow into plant stalks and can cause lodging. Such insect pests may include, but are not limited to: Black cutworm (*Agrotis ipsilon*), Common stalk borer (*Papaipema nebris*), European corn borer (*Ostrinia nubilalis*), and Wireworms (*Limonius* spp.). Furthermore, some insects that may infest and burrow in the roots, possibly causing root lodging can include: Rootworms (*Diabrotica* spp.) and White grubs (*Phyllophaga* spp.).

As shown generally in FIG. 1, the device 100, in one embodiment, comprises a generating device 110 carried by the vehicle for generating a moving fluid stream providing the wind force to simulate one or more naturally-occurring wind conditions. According to various embodiments of the present invention, the generating device 110 may include, but is not limited to: a turbine; a fan; a propeller; an impeller device; and/or combinations thereof. As shown generally in FIG. 3 the generating device 110 may comprise a rotary fan carried on a subframe 200 operably engaged with and/or carried by a vehicle 300. The frame 310 of the vehicle 300 (as described more fully below) may, in some embodiments, also carry one or more engines 340, corresponding to and operably engaged with the generating devices 110, for powering the generating devices 110 via one or more corresponding drive shafts 345 extending from the engines 340 to the generating devices 110. In other embodiments, engines 340 for powering the generating devices 110 may be directly operably engaged and/or integrated with the generating devices 110 such that each engine 340, generating device 110, and directing device 120 may be carried by a modular subframe 200 that may be operably engaged with and/or carried by one or more different types of vehicles, which may include, but are not limited to: a tracked vehicle; a combine; a wheeled vehicle; a raised-chassis vehicle; and/or combinations thereof. Furthermore, as shown generally in FIG. 2, a plurality of generating devices 110a-d, may be carried by a subframe 200 that may be operably engaged with a vehicle (see various vehicle embodiments shown generally in FIGS. 3, 6-8, 14, and 15) for moving the device 100 relative to the plants. For example, and as described in further detail below, FIG. 3 shows one embodiment of a vehicle 300 for carrying a plurality of generating devices 110 via a subframe 200 that may be suspended above the rows of plants as the vehicle advances in a first direction 360. Furthermore, as shown generally in FIG. 15, a trailer 1500 may be provided with an offset frame 1520 for suspending carrying a plurality of generating devices 110 via a subframe 200 that may be suspended from and/or cantilevered from the offset frame 1520 such that the trailer 1500 may be advanced (via a hitch 1530 connection to a utility vehicle) relative to a parallel and laterally adjacent row of plants 325. Therefore, as will be appreciated by one skilled in the art, some modular device 100 embodiments of the present invention (as shown generally in FIG. 1) may be carried by a number of different types of vehicles for advancing the device 100 relative to a variety of plants 325 such that the device 100 may be used to apply wind forces (simulating, for example, naturally-occurring wind conditions) to one or more of the plurality of plants 325 in a controlled research environment, so as to select individual plants having particular resistance characteristics to the applied wind force.

As shown in FIG. 1, the device 100 may further comprise a directing device 120 in fluid communication with the generating device 110 for directing the moving fluid stream towards a portion of at least one of the plurality of plants. As shown generally in FIG. 1, the generating device 110 may comprise an outlet 112 (defining a tube and/or duct, for example) that may be in fluid communication with the directing device 120, which, in some embodiments may also define one or more complementary ducts that may be capable of directing the moving fluid stream and/or splitting the moving fluid stream so as to direct a selected portion of the moving fluid stream towards a portion of at least one of the plurality of plants 325. While the ducts 125 defined by the directing device embodiments shown in FIGS. 1, 4, and 5 are generally rectangular in cross-section, the directing device 120 may also comprise one or more round and/or oval tubing elements for directing the moving fluid stream towards a portion of at least one of the plurality of plants 325.

Furthermore, as shown generally in FIG. 17, the device 100 may further comprise an air-permeable barrier (such as a screen, for example) 126 defining a plurality of openings 127a, 127b, 127c. According to such embodiments, the air-permeable barrier 126 may be operably engaged with the outlet 112 so as to cover a duct 125 defined thereby such that the plurality of openings 127a, 127b, 127c, are configured to subdivide the rectangular duct 125 aperture defined by some device 100 embodiments. As one skilled in the art will appreciate, the relative sizes of the plurality of openings 127a, 127b, 127c defined by the air-permeable barrier 126 may be tailored to direct the moving fluid stream towards a portion of at least one of the plurality of plants 325 at a substantially constant velocity along a vertical dimension of the air-permeable barrier 126. Furthermore, while FIG. 17 shows the air-permeable barrier 126 embodied as a screen, it should be understood that the air-permeable barrier 126 may comprise other types of porous and/or substantially air-permeable devices including, but not limited to: sintered metallic material; nonwoven porous material; filter material; and combinations of such air-permeable barriers.

Furthermore, according to some embodiments, the directing device 120 (and/or a duct 125 defined thereby) may also comprise at least one movable vane 121, 122 for adjusting at least one parameter of the moving fluid stream. For example, as shown generally in FIG. 4, the directing device 120 may comprise a directing vane 121 for directing the moving fluid stream 410 relative to an outlet of the directing device 120 such that an angle of the direction of the fluid stream exiting the directing device 120, relative to the plane of the outlet of the directing device, may be selectively modified by a user of the device. For example, as shown generally in FIG. 4, a directing vane 121 of the directing device 120 may be adjusted so as to provide a moving fluid stream 420 that may exit an outlet of the directing device at a selected angle relative to the direction of travel 360 (see FIG. 3) of the vehicle 300 carrying the directing device 200. The directing vane 121 may be adjusted to provide a moving fluid stream 420 that may exit an outlet of the directing device at an angle that may include, but is not limited to: 0°, 5°, 10°, 15°, 20°, 25°, 30°, 35°, 40°, 45°, 50°, 55°, 60°, 65°, 70°, 75°, 80°, 85° and 90°. Such an adjustment may, in some instances allow the directing device 120 to exert a wind force substantially parallel to a plurality of rows of plants 325 that may extend in corresponding row axes that may be substantially parallel to the vehicle's direction of travel 360. Furthermore, in other embodiments, a directing vane 121 of the directing device 120 may be adjusted so as to provide a moving fluid stream 430 that may exit an outlet of the directing device substantially perpendicular to the direction of travel 360 (see FIG. 3) of the vehicle 300 carrying the directing device 200. Such an alternate adjustment may allow the directing device 120 to exert a wind force substantially perpendicular to a plurality of rows of plants 325 that may extend in corresponding row axes that may be substantially parallel to the vehicle's direction of travel 360.

According to some embodiments, the directing vane 121 may be manually adjusted by an operator of the device 100 while the device 100 is not in operation. For example, the directing vane 121 may be operably engaged with an outlet of the directing device 120 via one or more fasteners (including, but not limited to: screws, bolts, and/or other fastener types), that may be loosened such that the directing vane 121 may be adjusted and releasably fixed at a selected position such that the moving fluid stream exiting the directing device 120 may be directed generally parallel (see element 420) to the direction of travel 360 (see generally FIG. 3) of the device 100 and/or vehicle 300 configured to carry the device 100. The directing vane 121 may also be adjusted and releasably fixed at a plurality of alternate positions such that the moving fluid stream exiting the directing device 120 may be directed at an angle (such as 90 degrees, as shown generally by the exiting fluid stream denoted as element 430) relative to the direction of travel 360 (see generally FIG. 3) of the device 100 and/or vehicle 300. Thus, according to various embodiments of the present invention, the directing device 120 may be adjusted and/or controlled such to direct the moving fluid stream (imparting a corresponding wind force) parallel to the direction of travel 360 of the device 100, substantially parallel to the direction of travel 360, and/or at a selected angle relative to the direction of travel 360. Thus, the movable vanes 121, 122 of the directing device may allow the device 100 of the present invention to direct a simulated wind force (corresponding to the moving fluid stream generated thereby) down a row of plants 325, generally perpendicular to a row of plants 325, and/or at any selected angle relative to a given row of plants 325. For example, various components of the directing device 120 (such as, for example, the directing vane 121) may be adjusted to provide a moving fluid stream 420 that may exit an outlet of the directing device at an angle that may include, but is not limited to: 0°, 5°, 10°, 15°, 20°, 25°, 30°, 35°, 40°, 45°, 50°, 55°, 60°, 65°, 70°, 75°, 80°, 85° and 90°, relative to a given row of plants 325.

In other device embodiments of the present invention, the directing vane 121 may also be controlled and/or actuated remotely while the device 100 is in operation by a controller 130 (see FIG. 1) (described in detail below) in communication with an actuator device 123 that may be capable of rotating the directing vane 121 about an axis that may be disposed generally parallel to a plane of an outlet of the directing device 120 (see generally, FIGS. 4 and 5). The actuator device 123 may be in communication with the controller device 130 and be responsive thereto in order change an angle and/or position of the directing vane 121 relative to an outlet of the directing device 120. The actuator device 123 may include, but is not limited to: pneumatic actuators; hydraulic actuators; electromechanical devices; indexed rotary actuators; and/or combinations thereof.

As shown in FIG. 4, some device embodiments of the present invention include a directing device 120 (and/or a duct defined thereby) that may also comprise at least one shutter vane 122 for selectively shutting off and/or selectively impeding the flow of the moving fluid stream that may exit an outlet of the directing device 120. The shutter vane 122 may, in some embodiments, be rotatable about an axis that may be disposed generally parallel to a plane of an outlet of the directing device 120 (see generally, FIGS. 4 and 5) and such that the shutter vane 122 may be selectively disposed in an "open" position (such that the moving fluid stream may exit the directing device 120 and be subsequently adjusted and/or directed by the directing vane 121 that may be operably engaged with an outlet of the directing device (as shown generally in FIGS. 4 and 5). Furthermore, according to some embodiments, the shutter vane 122 may also be rotated to a "closed" position to selectively halt the moving fluid stream before the moving fluid stream exits the directing device.

As described above with respect to the directing vane 121, the rotation, opening, and/or closing of the shutter vane 122 may be controlled by a controller device 130 in communication with the directing device 120. According to some device embodiments, the controller device 130 may also be in communication with an actuator device 123 configured to be capable of selectively rotating, opening, and/or closing the shutter vane 122 in order to control the exit of the moving fluid stream from the directing device 120. The actuator device 123 for controlling the shutter vane 122 may be in communication with and/or supplement a separate actuator device for controlling the movement and/or rotation of the directing vane 121 such that an operator of the device 100 of the present invention may, in some embodiments, control (via the controller 130) the moving fluid stream generated by the generating device 100. The actuator devices 123 for controlling the shutter vane 122 may include, but are not limited to: pneumatic actuators; hydraulic actuators; electromechanical devices; indexed rotary actuators; and/or combinations thereof. The actuator device 123 may be capable of rapidly rotating, opening, and/or closing the shutter vane 122 so as to be capable of providing the moving fluid stream (and directing the moving fluid stream) towards one or more portions of a plant in a "pulsed" pattern (which may correspond to the opening of the shutter vane 122). For example, in some embodiments, wherein the device 100 may be used to evaluate plants 325 for resistance to "brittle snap," the shutter vane 122 may be actuated to provide a pulsed moving fluid stream (and corresponding fluid stream) in a direction substantially parallel to the vehicle 300 travel direction 360 (and substantially parallel to a row of plants 325) wherein the exerted wind force is alternatively "on" (corresponding to an open shutter vane 122) for one second, and "off" (corresponding to a shut shutter vane 122) for one second.

Thus, the various device 100 embodiments described herein may be used to precisely control and/or optimize at least one parameter of the moving fluid stream such that at least one of the plurality of plants 325 may be evaluated with respect to a wind-resistant physical characteristic. For example, as described herein, the at least one parameter controlled by the device 100 may include, but is not limited to: travel speed of the vehicle 300; pulse frequency and/or pattern of the moving fluid stream; volume of the moving fluid stream (e.g. as measured in CFM); and moving fluid stream delivery angle, height, and/or location relative to a primary ear attachment site (for maize plants, for example). As described herein with reference to FIGS. 18 and 19, various embodiments of the present invention may be used to precisely apply the moving fluid stream to both reference plants and at least one of a plurality of experimental plants (such as a potential wind-resistant hybrid or GMO, for example) and utilizing the resulting data (such as percentage of plants exhibiting brittle snap and/or root lodging in a particular row and/or stand) to evaluate one or more wind-resistant characteristics of a plant. Furthermore, the device 100 may be used to control one or more parameters of the applied moving fluid stream in order to optimize the resolution of the differences between hybrids in differing performance categories in the reference hybrid sets. For example, reference hybrid plants may be placed in performance categories based on the relative strength or failure to perform in natural storm events collected in a minimum of 3 growing seasons and meeting a data quality standard according to pre-defined performance guidelines.

As shown in FIG. 5, some device embodiments of the present invention may comprise a directing device 120 that defines ducts having an outlet aperture that is oriented at an acute angle relative to the outlet 112 of the generating device 110. In such embodiments, the directing device 120 may be capable of directing the moving fluid stream generally downward on the plants 325 to simulate a downward wind force. According to other embodiments of the present invention, one or more different directing devices 120 (each defining outlet apertures having a variety of different angles relative to the outlet 112 of the generating device 110) may be selectively attached to one or more of the generating devices 110. For example, as shown generally in FIGS. 1, 4, and 5, the directing devices 120 may be releasably attached to the generating device 110 via a plurality of fasteners (including, for example, screws, toggle bolts, quick-release pins, and/or other reusable and/or releasable fasteners) such that an operator of the device 100 may select various types of directing devices 120 for directing and/or controlling the moving fluid stream generated by the generating device 110. For example, an operator of the device 100 may select and attach the directing device 120 shown generally in FIG. 4 for directing the moving fluid stream towards the plants 325 along an axis that is generally parallel to the ground. In another example, an operator of the device 100 may select and attach the directing device 120 shown generally in FIG. 5 for directing the moving fluid stream towards the plants 325 along an axis that intersects the ground at an acute angle (so as to simulate a downdraft or other downward wind force that may be exerted on the plurality of plants 325).

As shown in FIG. 1, the device 100 of the present invention may also comprise a controller 130 in communication with at least one of the generating device 110 and the directing device 120 (including, in some examples, the movable vanes 121, 122 and actuators 123 included therein) for controlling at least one parameter of the moving fluid stream such that the at least one of the plurality of plants 325 may be evaluated with respect to a wind-resistant physical characteristic. For example, according to some embodiments, the parameters that may be adjusted using the components of the present device 100 may include, but are not limited to: a velocity of the moving fluid stream; a direction of the moving fluid stream; an angle of the moving fluid stream; a height of the moving fluid stream; a pulse frequency of the moving fluid stream; and/or combinations of the parameters listed above.

According to some embodiments, the controller 130 of the present invention may be in communication, via wired and/or wireless communication methods, with a generating device 110 of the present invention to control a velocity of the moving fluid stream generated thereby. For example, the controller 130 may be in communication with one or more throttle controls and/or braking mechanisms corresponding to the engines 340 that may power one or more of the corresponding generating devices 110. In other embodiments, the controller 130 may also be capable of selectively cycling the intensity and/or velocity of the generating devices 110 in order to generate a pulsed and/or oscillatory moving fluid stream that varies at a selected pulse frequency.

Furthermore, as described in detail above with respect to the directing devices shown generally in FIGS. 4 and 5 the controller 130 of the present invention may also be in communication (via wired and/or wireless techniques) with the directing device 120, movable vanes 121, 122, and/or actuators 123 thereof, for actuating, rotating, opening, and/or closing at least one of the directing vane 121 and the shutter vane 122 in order to control various parameters of the moving fluid stream that may be directed towards at least a portion of the plurality of plants 325 including, for example, a pulse frequency (corresponding to the frequency of the opening and/or closing of the shutter vane), a direction of the moving fluid stream (relative to the direction of travel 360 of the vehicle 300, for example), and/or an angle of the moving fluid stream relative to the ground, by controlling one or more additional movable vanes that may be included as part of the directing device 120 and controllable via one or more actuators 123.

As described in further detail below with respect to device embodiments of the present invention further comprising a vehicle 300 for carrying the device 100, the controller 130 may also be in communication with one or more components of the vehicle for adjusting at least one of: the speed of the vehicle 300 (as it advances in a first direction 360 relative to the plurality of plants 325); the frame 310 height of the vehicle 300 (by communicating with and/or controlling the one or more height adjustment devices 350); and/or the position of the subframe 200 relative to the frame 310 of the vehicle 300 (so as to be capable of converting the vehicle 300 and/or device 100 to a "travel-ready" mode as shown generally in FIG. 8. As shown generally in FIG. 3, the controller 130 may be carried within an operator cab 330, which may be operably engaged with the vehicle frame 310. In some such embodiments, the controller may comprise a user interface which may include, but is not limited to: a touch screen display, a computer device, a personal computer, a laptop computer, a dash-mounted controller unit, and/or another user interface component capable of receiving one or more operator inputs for communicating with the controller 130. Furthermore, according to various device 100 embodiments of the present invention, the controller 130 may comprise at least one of: a personal computer; a microprocessor; and combinations thereof.

Some device 100 device embodiments of the present invention are intended for use in agricultural research environments including research fields comprising a plurality of different research plots wherein a corresponding plurality of different plant varieties may be cultivated. Thus, in order to map, track, and/or catalog the application of wind forces (corresponding to the moving fluid stream generated and directed by the device 100 of the present invention), some embodiments of the present invention may also comprise a locator device (such as a GPS device or other locator device) in communication with said controller for locating a geographical location of at least one of the plurality of plants 325 so as to map the geographical location of the application of the simulated wind force within the agricultural environment.

In some agricultural research environments, various research plots (and their position relative to the boundaries of the research environment) may be marked with one or more electronic transmitters (such as an RFID device and/or a physical sign post or tag comprising a bar code or other unique and electronically-readable identifier. Thus, the device 100 embodiments of the present invention may also comprise one or more RFID and/or bar code scanners (in communication with the controller 130) for identifying and/or locating one or more of the plurality of plants 325 using an electronically-readable identifier. Furthermore, the device 100 embodiments of the present invention may also comprise a memory device (such as a hard drive, ZIP drive, flash memory unit, and/or other memory device for storing data) in communication with the controller 130 for storing data related to the operation of the device 100 of the present invention, the location of the plurality of plants 325, and/or the identity of the plants 325. For example, in some embodiments, the memory device may store data which may include, but is not limited to: a geographical location of at least one of the plurality of plants; a geographical location of the application of the simulated wind force; at least one parameter of the moving fluid stream; a characteristic of at least one of the plurality of plants; and combinations thereof.

According to other device and system embodiments of the present invention, the controller 130 of the present invention may be in communication with a plant imaging system and/or other sensor array such as that disclosed in U.S. Provisional Application No. 60/704,412, which is incorporated herein by reference in its entirety such that the controller 130 may be capable of sensing and/or analyzing the plants 325 and/or their surrounding environment and adjusting one or more parameters of the moving fluid stream generated by the device 100 in response to data received from the imaging system and/or sensor array. Thus, the controller 130 may be capable of receiving and/or compiling data related to a characteristic of one or more of the plurality of plants 325 and/or data corresponding to an environmental condition of the agricultural environment, including, but not limited to: relative humidity, temperature, barometric pressure, soil temperature, soil water content, and other factors. For example, the controller 130 (using data received from a sensor array), may control the device 100 to generate a lower-velocity and/or lower-frequency pulsed fluid stream in response to the detection of a particularly wet soil condition. Furthermore, the controller 130 may use plant characteristic data received from a sensor array (such as plant height and/or morphology) to control the device 100 to tailor the moving fluid flow parameters to select for positive standability characteristics in various plant species and/or in various life-cycle stages of similar plants that may be identified by detectable morphological differences.

As described generally above, and as shown in FIGS. 3, 6, 7, 8, 14, and 15, some device embodiments of the present invention may also comprise a vehicle for moving the device 100 relative to a plurality of plants 325 that may be cultivated in an agricultural environment. In some embodiments, as shown generally in FIGS. 3, 6, 7, 8, and 14, the vehicle may comprise a self-propelled vehicle (such as a tracked vehicle 300 and/or a cart 1420 configured to be capable of being advanced along one or more rails 1410 that may be installed in a laboratory, agricultural environment, and/or greenhouse).

For example, as shown generally in FIG. 14, one embodiment of the present invention may comprise a device 100 (comprising a generating device 110 and a directing device 120) carried by a cart and/or tram vehicle 1420 that may be advanced at a selected speed along a set of rails 1410 relative to a plurality of plants 325 that may be cultivated in a greenhouse and/or laboratory environment. According to such embodiments, the device 100 may be capable of applying a wind force to a plurality of plants 325 in a highly controlled environment (such as an indoor greenhouse and/or laboratory). Carrying the device 100 via rail 1410 and/or cart 1420 may further provide a relatively stable platform for the device 100 such that the directing device 120 (and the directing vanes 121 and shutter vanes 122 included in some embodiments thereof) may more provide a precisely controllable simulated wind force to the plurality of plants 325. Thus, some embodiments of the present invention may be used to apply precise simulated wind forces in an environment where humidity, soil conditions, light levels, and other growing conditions may be controlled such that the plants' 325 wind resistance (and/or susceptibility to certain wind failure mechanisms) may be evaluated in relation to such growing conditions. In other embodiments, rails 1410 may be placed in a growing field and/or research plot such that the device 100 of the present invention may also be carried via rail 1410 and cart 1420 in an outdoor agricultural environment. In some embodiments, the rails 1410 may be electrified to power the cart 1420. According to some other embodiments, the cart 1420 may also carry one or more motors 340 for powering the generating device 110 and/or the cart 1420. In other embodiments, the rail 1410 may comprise one or more computer-controlled linear actuators for advancing the cart 1420 (and or a platform (not shown) that may be carried by linear actuator embodiments of the rail 1410) relative to a plurality of plants 325. Thus, for example, a linear actuator device may be capable of advancing the generator device 110 and/or directing device 120 at a precise programmed velocity relative to the plurality of plants 1410 in order to more precisely model simulated wind forces.

As shown generally in FIG. 16, some embodiments of the device 100 (comprising a generating device 110 and a directing device 120) may be suspended from an overhead position. For example, the device 100 may be suspended by one or more lines 1610 from an overhead beam 1620 such that the device 100 may be suspended above a plurality of plants in an indoor and/or outdoor agricultural environment. For example, the overhead beam 1620 may include, but is not limited to, a cross-member beam of a greenhouse and/or laboratory structure. In other embodiments, the device 100 may also be suspended from beams 1620 and/or poles 1630 erected in an outdoor agricultural environment such as a research plot and/or a growing field. The lines 1610 may also, in some alternative embodiments, be suspended from one or more tracks (not shown) defined by and/or attached to one or more beams 1620 such that the device 100 may be selectively moved (while in a position suspended above an agricultural environment, relative to a plurality of plants 325 using via the tracks).

While some vehicle 300 embodiments of the present invention (as shown generally in FIGS. 3 and 6-8) may be self-propelled, some embodiments of the present invention (as shown generally in FIG. 15) may comprise a trailer 1500 including wheels 1510 and a hitch 1530 assembly for carrying the device 100 such that the device 100 of the present invention may be towed behind a variety of different vehicles that may be available for use in an agricultural environment including, but not limited to: trucks, tractors, and harvesting equipment. As shown generally in FIG. 15, some trailer 1500 embodiments for carrying the generating device 110 and directing device 120 of the present invention may comprise an offset frame 1520 operably engaged with a subframe 200 for suspending the device 100 (including the generating devices 110 and corresponding directing devices 120) relative to a row of plants 325 so as to be capable of applying a simulated wind force (that may be precisely controlled using the vanes 121, 122 provided in some directing device 120 embodiments) parallel and/or perpendicular to one or more rows of plants being cultivated in an agricultural environment. The offset frame 1520 may be configured to suspend the device 100 components of the present invention over and/or between a row of plants from one or both sides of the trailer 1500 such that the trailer 1500 may be pulled behind a utility vehicle in a corridor defined between rows of plants 325. As shown in FIG. 15, the trailer 1500 may be an integrated system for applying a wind force to a plurality of plants in an agricultural environment, including not only the generating device 110, directing device 120, and controller 130, but also motors 340 and/or other auxiliary systems (such as a locator device, memory device, and/or other electronic control elements and/or actuators for operating the movable vanes 121, 122 of the directing device 120). Thus, the trailer 1500 may operate as an independent device for generating a wind force to be applied to a plurality of plants such that at least one of the plurality of plants may be evaluated with respect to a wind-resistant physical characteristic without the need for auxiliary power to be supplied by a tow vehicle.

The placement of one or more generating devices 110 and/or directing devices 120 (and, in some embodiments, motors and/or engines 340 for powering the generating devices 110) on a subframe 200 may allow the device 100 embodiments of the present invention (see FIG. 2, for example) to be carried by a variety of vehicles in a variety of configurations that may be tailored to a specific agricultural environment. For example, as shown generally in FIG. 6, the generating device 110 and directing device 120 components of the present invention may be carried by a subframe 200 that may be suspended above a plurality of plants 325 (see FIGS. 3 and 7, generally) by a vehicle 300 including a frame 310 that may be operably engaged with and/or be capable of carrying the subframe 200. Furthermore, as shown in FIG. 15, the subframe 200 (carrying the device 100 of the present invention) may be operably engaged with an offset frame 1520 of a trailer 1500 adapted to be capable of suspending the subframe 200 adjacent to the travel path of the trailer 1500 such that a tow vehicle may advance the device 100 substantially parallel to a row of plants 325 while traveling in a corridor offset from a plant row.

According to some embodiments, as shown generally in FIGS. 3, 6, 7, and 8, the vehicle 300 may comprise a tracked vehicle including at least a fluid of tracked wheel assemblies 320 extending downward from the sides of the vehicle frame 310. However, as will be appreciated by one skilled in the art, some modular device 100 embodiments of the present invention (as shown, for example, in FIGS. 1 and 2) may be carried by a subframe 200 and/or be attached to a variety of different types of vehicles that may be suited for advancing the device 100 (including the generating device 110 and directing device 120) relative to a plurality of plants 325 in an agricultural environment (such as a research plot). For example, the vehicle 300 carrying the device 100 of the present invention may include, but is not limited to: a tractor; a tracked vehicle (including, for example, a wheel and track assembly sometimes used in military vehicles and/or bulldozer machinery); a trailer 1500 (as discussed above, and shown generally in FIG. 15); a combine or other piece of mobile harvesting machinery; a cart 1420 (see FIG. 14) adapted to be carried on corresponding rails 1410; a four-wheeled vehicle (including, for example, a utility truck having a plow or other attachment suitable for carrying the subframe 200 shown generally in FIG. 2); and/or combinations of the listed vehicles. In some additional embodiments, the vehicle 300 carrying the device 100 of the present invention may comprise a high-clearance agricultural sprayer or other high-clearance 4-wheel drive tractor such as, for example, the STS-10 Sprayer Vehicle, manufactured by Hagie Manufacturing Company of Clarion, Iowa.

One example of a specialized vehicle 300 that may be included as a portion and/or carrier of the device 100 of the present invention is shown generally in FIGS. 6, 7, and 8. The vehicle 300 includes a frame 310 operably engaged with and/or carrying the generating device 110, directing device 120 and controller 130. As described generally above, the frame 310 may be capable of carrying a modular subframe 200 that may, in turn, carry the generating device 110 and directing device 120 of the present invention. As shown in FIG. 7, in some vehicle 300 embodiments, the subframe may carry four generating devices 110 and four corresponding directing devices 120 (such as, for example, the directing devices shown in FIGS. 4 and 5) at the front of the vehicle 300 such that as the vehicle is advanced in a travel direction 360 the directing devices may be capable of exerting a wind force at an angle relative to a row of plants 325. As described above with respect to the directing devices and FIGS. 4 and 5, the directing vanes 121 of the directing devices 120 may allow for the application of a wind force 420 down a row of plants (wherein the row axis extends substantially parallel to the vehicle travel direction 360) and/or a perpendicular wind force 430 that may be exerted substantially perpendicular to the row axes and across one or more rows of plants 325 that may be enclosed by the directing devices 120 (which may extend downward from the subframe 200 as shown in FIG. 7).

Furthermore, the vehicle 300 may also comprise at least two parallel rolling elements 320 extending downward from the corresponding two sides of the vehicle frame 310 such that frame may be supported above the plurality of plants 325 (see generally, FIG. 7 wherein the vehicle frame 310 is shown suspended at a height h, above the plurality of plants 325 via a plurality of height-adjustment devices 350. The rolling elements 320 may comprise, in some embodiments, wheels, wheel and track assemblies; and/or combinations thereof. According to some embodiments, the wheel and track assemblies 320 shown generally in FIGS. 6-8 may be utilized to effectively distribute the relatively heavy weight of the vehicle 300, subframe 200, and modular device 100 of the present invention such that the vehicle may more easily traverse muddy and/or rain-soaked agricultural environments. Muddy and/or soaked terrain may be commonly encountered by the vehicle 300 of the present invention, especially in method embodiments (see generally below) for identifying plants 325 exhibiting root lodging characteristics, which may be preceded by heavy irrigation of the agricultural environment prior to the application of a simulated wind force. The more effective distribution of the vehicle 300 weight, afforded in some embodiments by the use of wheel and track assemblies 320, may allow the device 100 of the present invention be carried across muddy environments to simulate wind conditions that often result in the dislodging of plant roots in rain-soaked and/or muddy soils. Thus, the use of wheel and track assemblies 320 as rolling elements may allow the vehicle 300 of some embodiments of the present invention to more effectively characterize and/or select for root lodging characteristics of plants 325.

According to some embodiments of the present invention, the vehicle 300 may further comprise a cab 330, operably engaged with the vehicle frame 310, for housing an operator of the device 100 (and/or driver of the vehicle 300). In some embodiments, the cab 330 may also carry and/or house the controller 130 of the present invention such that an operator of the vehicle 300 and/or device 100 may be capable of viewing outputs from the controller and/or inputting data and/or controls for adjusting one or more parameters of the moving fluid stream generated and/or directed by the generating device 110 and directing device 120 of the present invention. The cab 330 may also comprise controls and/or input devices such that the operator may control the overall operation of the vehicle, such as throttle controls for one or more motors 340 (which may power the rolling elements 320 of the vehicle 300 and/or one or more of the generating devices 100. The cab 330 may also house braking controls, controls for actuating the movable vanes 121, 122 of the directing device 120, controls for actuating the height adjustment devices 350 (as described below with respect to FIGS. 6 and 7), controls for external and/or cab lighting, air conditioning equipment for the comfort of an operator, and/or other controls that may be used to operate the vehicle 300, generating device 110, and/or directing device 120 of the present invention.

Furthermore, as shown in FIGS. 3 and 6-8, the vehicle 300 may also comprise one or more motors and/or engines 340, operably engaged with the vehicle frame 310, for moving the vehicle 300 relative to the plurality of plants 325. As described above, the vehicle 300 may also carry one or more motors 340 for powering the generating devices 110 of the present invention via one or more drive shafts 345 that may extend from the vehicle frame 310 to the generating devices 110 (which may be carried by a separate subframe 200). This exemplary embodiment is shown generally in FIG. 6. The vehicle 300 may also carry one or more motors 340 for powering the rolling elements 320 (such as the wheel and track assemblies 320 of FIGS. 6-8, and/or a wheel and axle arrangement via a drivetrain and/or transmission unit that may be arranged in a manner that will be appreciated by one skilled in the art.

The vehicle 300 of the present invention may also comprise a plurality of height adjustment devices 350 operably engaged between the vehicle frame 310 and the rolling elements 320 such that said frame 310 may be raised or lowered above a maximum height h (see FIG. 7) of the plurality of plants 325. Furthermore, the height adjustment devices may also be lowered such that the vehicle height h is relatively low such that a simulated wind force (applied via the device 100) of the present invention) may be applied to immature plants and/or crop plants having a lower height profile. In addition, according to some embodiments, each of the height adjustment devices 350 may be individually adjustable such that one or more of the height adjustment devices 350 may be lengthened while the remaining height adjustment devices 350 remain in a shortened configuration. By individually controlling the height adjustment devices 350, an operator of the present invention (and/or a controller 130) may ensure that the vehicle 300 (and the generating device 110 and/or directing device 120 carried thereby) remains substantially level, regardless of uneven terrain that may be present in the agricultural environment in which the vehicle 300 may be operating. Furthermore, the height adjustment devices 350 may also be used to raise and/or lower the sides, rear, front, and/or one or more corners of the vehicle 300 frame in order to adjust the angle and/or orientation at which the moving fluid stream exits the directing device 120 and impacts the plurality of plants 325. In some embodiments, the height adjustment devices 350 may include, but are not limited to: hydraulic actuators; pneumatic actuators; adjustable heavy-duty shocks; and combinations thereof.

As described generally above, and as shown in FIG. 8, the generating device 110 and directing device 120 may be carried via a subframe 200 that may be operably engaged with a vehicle frame 310. The subframe 200 may also be operably engaged with the vehicle frame 310 via one or more actuators 210 which may lift the subframe 200 relative to the vehicle frame 310. As shown in FIG. 8, the subframe and vehicle frame may be rotatably fixed to a connector arm that may be lifted (by the actuator 210 (which may include a hydraulic and/or pneumatic actuator for lifting the subframe 210) through an angle 215 such that the subframe 210 may be lifted to a "travel-ready" position. Thus, the vehicle 300 may advance over uneven and/or obstacle-strewn terrain without dragging the directing devices 120 over such terrain and/or obstacles. According to some such embodiments, the controller 130 may be in communication with the adjustable subframe 210 (or the actuator 210) for raising and/or lowering the subframe relative to the ground and/or to the plurality of plants. According to some embodiments, the controller 130 may adjust the angle 215 at which the subframe 200 is oriented relative to the vehicle frame 310 and/or the underlying terrain of the surrounding agricultural environment.

Some embodiments of the present invention also include a method for applying a wind force to a plurality of plants 325 in an agricultural environment (such as an agricultural research plot). As shown in FIG. 9, one embodiment of the method of the present invention comprises the following steps: step 910 for generating a moving fluid stream (see FIGS. 4 and 5, element 410) providing the wind force; step 920 for directing the moving fluid stream (see FIGS. 4 and 5, elements 420 and 430) towards a portion of at least one of the plurality of plants 325; and step 930 controlling at least one parameter of the moving fluid stream such that the at least one of the plurality of plants 325 may be evaluated with respect to a wind-resistant physical characteristic.

As shown in FIG. 19, some method embodiments of the present invention may further comprise step 1910 for selecting the at least one of the plurality of plants for the wind resistant physical characteristic. According to some embodiments, step 1910 for selecting may further comprise comparing the wind resistant physical trait of the at least one of the plurality of plants to a known wind resistant physical trait of at least one reference plant. While in some embodiments, step 1910 may comprise selecting for a particular wind resistant characteristic, other method embodiments may further comprise generally determining if any of the plurality of plants exhibit the wind resistant physical characteristic. For example, in some embodiments, the moving air stream applied (see step 920, for example) to the plurality of plants may result in a brittle snap (or other plant failure) in all of the plurality of plants, which may indicate that none of the plurality of plants exhibit a particular wind resistant physical trait.

For example, some method embodiments of the present invention may comprise precisely controlling the parameters of a moving air stream that is applied to one or more pluralities of plants so as to select and characterize germplasm as well as to phenotype and identify of favorable and/or undesirable quantitative trait loci (QTLs) in the germplasm which may determine a variety of wind-resistant physical traits that may include, but are not limited to: brittle snap resistance, stalk strength, and root strength in maize. One example, of such a characterization for maize hybrids is shown generally in FIG. 18, where PH01, PH02, and PH03 represent reference hybrids with below average (denoted by "PBA"), average (denoted by "PA") and above average (denoted by "PAA"), respectively, predicted brittle snap strength based on a number of data points collected after natural brittle events observed in reference plants over the past 10 years, and EXP01, EXP02, EXP03, and EXP04, and EXP05 represent experimental hybrids which may be characterized (using for example, the various method embodiments of the present invention) for brittle snap strength.

The step 930 for controlling the moving air stream applied to the plurality of experimental hybrid plants may also serve to highlight and/or optimize the resolution of the differences between hybrids in differing performance categories in the reference hybrid sets. Reference hybrids may be placed in performance categories based on the relative strength or failure to perform in natural storm events (wherein "strength" is generally indicated herein in terms of a "wind-resistant physical characteristic) collected in a minimum of 3 growing seasons and meeting a data quality standard defined by selected performance guidelines.

According to various embodiments of the present invention, the wind-resistant physical characteristic evaluated using the method steps of the present invention may include, but is not limited to: a root lodging factor; a stalk lodging factor; a brittle stem break factor; and combinations thereof. According to some method embodiments of the present invention, the method may be used to evaluate one or more specific wind-resistant physical characteristics including, but not limited to: an early season root lodging factor, a late season root lodging factor, and plant standability characteristics as affected by selected insect pests and/or selected disease types. Early season root lodging is defined as root lodging which occurs prior to or at anthesis. Late season root lodging is root lodging which occurs post anthesis through flowering. Stalk lodging in corn can be caused by a number of diseases that may include but are not limited to: Anthracnose stalk rot caused by *Colletotrichum graminicola*, *Fusarium* stalk rot caused by *Fusarium moniliforme*, *Diplodia* stalk rot caused by *Diplodia maydis*, *Gibberella* stalk rot caused by *Gibberella zeae*. Furthermore, some insects infest and burrow into plant stalks and can cause lodging. Such insect pests may include, but are not limited to: Black cutworm (*Agrotis epsilon*), Common stalk borer (*Papaipema nebris*), European corn borer (*Ostrinia nubilalis*), and Wireworms (*Limonius* spp.). Furthermore, some insects that may infest and burrow in the roots, possibly causing root lodging can include: Rootworms (*Diabrotica* spp.) and White grubs (*Phyllophaga* spp.).

According to some method embodiments of the present invention, one or more preparation steps may be performed prior to the commencement of the method steps listed below. For example, in order to evaluate root lodging factors for certain plant varieties (such as corn), the agricultural environment may be thoroughly irrigated (using, for example, drip hoses and/or tape) prior to the application of the simulated wind force.

As shown generally in FIG. 10, some method embodiments of the present invention may further comprise a providing step 1010 for providing: (1) a generating device 110 adapted to be capable of being carried by a vehicle 300 for generating the moving fluid stream 410, (2) a directing device 120 (defining a duct and/or channel as shown generally in FIGS. 4 and 5) in fluid communication with the generating device 110 for directing the moving fluid stream, and (3) a controller 130 in communication with the generating device 110 and the directing device 120 for controlling at least one parameter of the moving fluid stream. In some embodiments of the method of the present invention, the device 100 embodiments (shown generally in FIG. 1) may be provided in step 1010 for performing the method steps 910-930 to apply the simulated wind force in a precisely-controlled and/or directed manner towards a portion of at least one of the plurality of plants 325 in order to evaluate the plants with respect to a wind-resistant physical characteristic. According to some method embodiments, the providing step 1010 may further comprise providing a vehicle 300 (see, for example, FIGS. 3, 6-8) for carrying the generating device 110, the directing device 120, and/or the controller 130 such that the generating device 110, the directing device 120, and the controller 130 may be moved relative to the plurality of plants 325. Thus, some method embodiments of the present invention, as shown generally in FIG. 11, may further comprise step 1110 for moving the generating device 110, the directing device 120, and the controller 130 relative to the plurality of plants 325. For example, in some method embodiments wherein, for example, the method is utilized for the selection of plants 325 having relative resistance to brittle snap in response to a "pulsed" wind force (i.e., alternative one second periods of "on" and "off"), step 1110 may also comprise moving the generating device 110, the directing device 120, and the controller 130 relative to the plurality of plants 325 at a relatively slow pace (such as, for example, 0.8 to 1.2 miles per hour, such that each plant may be subjected to 6-8 pulsed wind gusts from the directing device 120.

The providing step 1010 may also further comprise providing an adjustable subframe 200 (see FIG. 2 (generally showing a plurality of generating devices 110 carried by the subframe 200) and FIG. 3 (showing the subframe 200 operably engaged with a vehicle 300) operably engaged between the generating device 110, the directing device 120, and the controller 130. According to some such method embodiments, the method may further comprise adjusting a height of the adjustable subframe 200 in relation to the vehicle 300 (and/or the vehicle frame 300, as shown in FIG. 8) such that the generating device, directing device and controller may be raised and lowered in relation to the plurality of plants 325 and/or the ground defining the agricultural environment. As described generally above with respect to the device 100 embodiments of the present invention, the controlling step 930 may further comprise controlling the adjustable subframe 200 such that the generating device 110, directing device 120, and/or controller 130 may be raised and lowered in relation to the plurality of plants 325.

According to some method embodiments of the present invention, the generating step 910 may further comprise generating the moving fluid stream intermittently at a pulse frequency. As discussed in further detail above, the controller 130 of the device embodiments of the present invention may be in communication with at least one of a motor 340, and/or the generating device 110 for controlling and/or cycling the velocity of the generating device 110 (which may comprise a rotary fan, turbine, or other device capable of generating a moving fluid stream). For example, the generating step 910 may comprise using the controller 130 to actuate a throttle and/or braking system to adjust and/or cycle the revolutions of a rotary generating device (such as a rotary fan) so as to generate the moving fluid stream intermittently at a pulse frequency. Thus, step 910 of the method of the present invention may allow, in some embodiments, for the generation of a pulsed wind force (having a characteristic pulse frequency) that may approximate the pulsing and/or intermittent wind forces that may lead to brittle snap, stem breakage, and/or node failure in some susceptible plants.

Furthermore, in some method embodiments of the present invention, the directing step 920 of the present invention may comprise actuating at least one movable vane (see, for example, elements 121, 122 of FIGS. 4 and 5) for adjusting the at least one parameter of the moving fluid stream generated in step 910 of the method of the present invention. In some method embodiments, an operator may manually actuate one or more directing vanes 121 to adjust the angle at which the moving fluid streams (420, 430) exit the directing device 120. Furthermore, the directing step 920 may also involve utilizing an actuator 123 to automatically rotate (via a control signal sent by the controller 130, for example) at least one of a directing vane 121 and/or a shutter vane 122 (as described in detail above with respect to FIGS. 4 and 5). The directing step 920 may also comprise installing an alternate directing device 120 defining a modified and/or angled duct (see FIG. 5, for example) such that the moving fluid streams (420, 430) exiting the directing device 120 may be directed generally downward towards at least one of the plurality of plants 325. Furthermore, in some method embodiments utilizing the various vehicle 300 embodiments described above, the directing step 920 may further comprise adjusting at least one of the height adjustment devices 350 for altering an angle at which a frame 310 of the vehicle 300 may be oriented relative to the ground and/or the plants 325 such that the moving fluid streams (420, 430) exiting the directing device 120 may be directed at a selected angle towards and/or away from at least one of the plurality of plants 325.

The controlling step 930 may also comprise controlling at least one parameter of the moving fluid streams 410, 420, 430 generated (see step 910) and/or directed (see step 920) using the various method steps of the present invention. According to various method embodiments, the controlling step 930 may comprise controlling fluid stream parameters including, but not limited to: a velocity of the moving fluid stream (by controlling, for example a speed of the generating device 110 and/or a position of the movable vanes 121, 122); a direction of the moving fluid stream; a height of the moving fluid stream; a pulse frequency of the moving fluid stream; and combinations thereof. In some method embodiments, the direction and/or angle of the moving fluid stream (410, 420, 430) may be controlled, for example, by at least one of: adjusting a position of the movable vanes 121, 122, changing a type of directing device 120 (see FIGS. 4-5), and/or adjusting a position of the vehicle frame 310 and/or subframe 200 relative to the ground. Furthermore, the pulse frequency of the moving fluid stream may be controlled, for example, by at least one of: adjusting a position of the shutter vane 122 from an "open" to "closed" position according to a pre-set pattern (such as, one second "on" and one second "off") and/or cyclically adjusting the speed of the generating device 110 to pulse the moving fluid stream generated thereby.

As shown generally in FIG. 12, the method embodiments of the present invention may also comprise step 1210 for locating a geographical location of at least one of the plurality of plants 325 so as to map the geographical location of the application of the simulated wind force within the agricultural environment. Because, the method of the present invention may be performed in an agricultural research plot wherein a number of experimental plant hybrids, genetically modified organisms (GMO), and various other plant varieties may be grown in specific plots, it is preferable in some method embodiments to perform the locating step 1210 such that the application of selected simulated wind forces may be mapped accurately with respect to the known locations of certain hybrid and/or GMO varieties such that the response of these varieties to a given simulated wind force may be accurately ascertained. Furthermore, as shown generally in FIG. 13, the method embodiments of the present invention may also comprise step 1310 for storing data related to the application of a simulated wind force and/or the position of the vehicle 300 and/or device 100 relative to a given research plot. The storing step 1310 may further comprise storing data in a memory device that may be in communication with and/or integrated with a controller 130. In some embodiments, the storing step 1310 may also comprise engaging a removable memory device (such as a ZIP drive, flash memory device, data disk) with the controller 130 for copying data related to the application of a plurality of different simulated wind forces in one or more different research plots. Thus, an operator of the device 100 embodiments of the present invention may download and/or copy such data from the controller and carry such data to an offsite laboratory, database, and/or statistical analysis system for determining which plants 325 and/or plant varieties may be least susceptible to damage and/or failure when exposed to a selected simulated wind force. According to various method embodiments, the storing step 1310 may comprise storing data including, but not limited to: a geographical location of at least one of the plurality of plants 325; a geographical location of the application of the simulated wind force; at least one parameter of the moving fluid stream; a characteristic of at least one of the plurality of plants 325 (such as, for example, age, GMO designation, hybrid designation, moisture content, genotypic information, and/or other plant information); and combinations of the data types listed above.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device for applying a wind force to a plurality of plants in an agricultural environment, the device adapted to be carried by a vehicle for moving the device relative to the plurality of plants, the device comprising:
    a generating device carried by the vehicle for generating a moving fluid stream providing the wind force;
    a directing device in fluid communication with said generating device for directing the moving fluid stream towards a portion of at least one of the plurality of plants; and
    a controller in communication with said generating device and said directing device for controlling at least one parameter of the moving fluid stream,
    wherein said generating device is configured for generating the moving fluid stream such that the at least one of the plurality of plants may be evaluated with respect to a wind-resistant physical characteristic.

2. A device according to claim 1, wherein the generating device comprises at least one of:
    a turbine;
    a fan;
    a propeller;
    an impeller device; and
    combinations thereof.

3. A device according to claim 1, wherein the generating device is further adapted to be capable of generating the moving fluid stream intermittently at a pulse frequency.

4. A device according to claim 1, wherein the directing device comprises a duct configured to direct the moving fluid stream from an outlet of the directing device towards the portion of at least one of the plurality of plants.

5. A device according to claim 4, wherein the duct further comprises at least one movable vane for adjusting the at least one parameter of the moving fluid stream.

6. A device according to claim 4, wherein the duct defines at least one outlet aperture, device further comprising at least one air-permeable barrier operably engaged with the duct and defining a plurality of openings configured to subdivide the outlet aperture so as to adjust the at least one parameter of the moving fluid stream.

7. A device according to claim 1, wherein the at least one parameter comprises at least one of:
    a velocity of the moving fluid stream;
    a direction of the moving fluid stream;
    a height of the moving fluid stream;
    a pulse frequency of the moving fluid stream; and
    combinations thereof.

8. A device according to claim 1, further comprising a locator device in communication with said controller for locating a geographical location of at least one of the plurality of plants so as to map the geographical location of the application of the simulated wind force within the agricultural environment.

9. A device according to claim 1, further comprising a memory device in communication with said controller for storing at least one of:
    a geographical location of at least one of the plurality of plants;
    a geographical location of the application of the simulated wind force;
    the at least one parameter of the moving fluid stream;
    an environmental condition;
    a characteristic of at least one of the plurality of plants; and
    combinations thereof.

10. A device according to claim 1, wherein said controller comprises at least one of:
    a personal computer;
    a microprocessor; and
    combinations thereof.

11. A device according to claim 1, further comprising an adjustable subframe operably engaged between said generating device, said directing device, said controller, and the vehicle, wherein said adjustable subframe may be raised or lowered in relation to the vehicle such that said generating device, said directing device and said controller may be raised and lowered in relation to the plurality of plants.

12. A device according to claim 11, wherein said controller is in communication with said adjustable subframe for controlling said adjustable subframe such that said generating device, said directing device and said controller may be raised and lowered in relation to the plurality of plants.

13. A device according to claim 1, wherein the wind-resistant physical characteristic is at least one of:
    a root lodging factor;
    a stalk lodging factor;
    a brittle stem break factor; and
    combinations thereof.

14. A device for applying a wind force to a plurality of plants in an agricultural environment comprising:
    a vehicle for moving the device relative to the plurality of plants;
    a generating device carried by the vehicle for generating a moving fluid stream providing the wind force;
    a directing device in fluid communication with said generating device for directing the moving fluid stream towards a portion of at least one of the plurality of plants;
    a controller in communication with said generating device and said directing device for controlling at least one parameter of the moving fluid stream such that the at least one of the plurality of plants may be evaluated with respect to a wind-resistant physical characteristic.

15. A device according to claim 14, wherein said vehicle is at least one of:
   a tractor;
   a tracked vehicle;
   a trailer;
   a combine;
   a four-wheel drive vehicle; and
   combinations thereof.

16. A device according to claim 14, wherein said vehicle further comprises:
   a frame operably engaged with said generating device, said directing device and said controller, said frame comprising two sides;
   at least two parallel rolling elements extending downward from the corresponding two sides of said frame such that said frame may be supported above the plurality of plants.

17. A device according to claim 16, wherein said at least two parallel rolling elements comprise at least one of:
   wheels;
   wheel and track assemblies; and
   combinations thereof.

18. A device according to claim 16, wherein said vehicle further comprises:
   a cab, operably engaged with said frame, for housing an operator;
   at least one motor, operably engaged with said frame, for moving the vehicle relative to the power of the plants;
   a plurality of height adjustment devices operably engaged between said frame and said at least two parallel rolling elements such that said frame may be raised or lowered above a maximum height of the plurality of plants.

19. A device according to claim 18, wherein said plurality of height adjustment devices comprise at least one of:
   hydraulic actuators;
   pneumatic actuators; and
   combinations thereof.

20. A device according to claim 18, wherein said controller is in communication with said plurality of height adjustment devices for controlling said plurality of height adjustment devices such that said frame may be raised or lowered above a maximum height of the plurality of plants.

21. A device according to claim 16, wherein said frame further comprises an adjustable subframe operably engaged between said generating device, said directing device, said controller, and said frame, wherein said adjustable subframe may be raised or lowered in relation to said frame such that said generating device, said directing device and said controller may be raised and lowered in relation to the plurality of plants.

22. A device according to claim 21, wherein said controller is in communication with said adjustable subframe for controlling said adjustable subframe such that said generating device, said directing device and said controller may be raised and lowered in relation to the plurality of plants.

23. A device according to claim 14, wherein the generating device comprises at least one of:
   a turbine;
   a fan;
   a propeller;
   an impeller device; and
   combinations thereof.

24. A device according to claim 14, wherein the generating device is further adapted to be capable of generating the moving fluid stream intermittently at a pulse frequency.

25. A device according to claim 14, wherein the directing device comprises a duct configured to direct the moving fluid stream from an outlet of the directing device towards the portion of at least one of the plurality of plants.

26. A device according to claim 14, wherein the duct further comprises at least one movable vane for adjusting the at least one parameter of the moving fluid stream.

27. A device according to claim 25, wherein the duct defines at least one outlet aperture, device further comprising at least one air-permeable barrier operably engaged with the duct and defining a plurality of openings configured to subdivide the outlet aperture so as to adjust the at least one parameter of the moving fluid stream.

28. A device according to claim 14, wherein the at least one parameter comprises at least one of:
   a velocity of the moving fluid stream;
   a direction of the moving fluid stream;
   a height of the moving fluid stream;
   a pulse frequency of the moving fluid stream; and
   combinations thereof.

29. A device according to claim 14, further comprising a locator device in communication with said controller for locating a geographical location of at least one of the plurality of plants so as to map the geographical location of the application of the simulated wind force within the agricultural environment.

30. A device according to claim 14, further comprising a memory device in communication with said controller for storing at least one of:
   a geographical location of at least one of the plurality of plants;
   a geographical location of the application of the simulated wind force;
   the at least one parameter of the moving fluid stream;
   an environmental condition;
   a characteristic of at least one of the plurality of plants; and
   combinations thereof.

31. A device according to claim 14, wherein said controller comprises at least one of:
   a personal computer;
   a microprocessor; and
   combinations thereof.

32. A device according to claim 14, wherein the wind-resistant physical characteristic is at least one of:
   a root lodging factor;
   a stalk lodging factor;
   a brittle stem break factor; and
   combinations thereof.

33. A method for applying a wind force to a plurality of plants in an agricultural environment, the method comprising:
   generating a moving fluid stream providing the wind force;
   directing the moving fluid stream towards a portion of at least one of the plurality of plants;
   controlling at least one parameter of the moving fluid stream; and
   evaluating at least one of the plurality of plants with respect to a wind-resistant physical characteristic.

34. A method according to claim 33, further comprising providing a generating device adapted to be capable of being carried by a vehicle for generating the moving fluid stream, a directing device in fluid communication with said generating device for directing the moving fluid stream; and a controller in communication with said generating device and said directing device for controlling at least one parameter of the moving fluid stream.

35. A method according to claim 34, further comprising moving the generating device, the directing device, and the controller relative to the plurality of plants.

36. A method according to claim 35, further comprising providing a vehicle for carrying the generating device, the directing device, and the controller such that the generating device, the directing device, and the controller may be moved relative to the plurality of plants.

37. A method according to claim 33, wherein the generating step further comprises generating the moving fluid stream intermittently at a pulse frequency.

38. A method according to claim 34, wherein the directing step further comprises actuating at least one movable vane for adjusting the at least one parameter of the moving fluid stream.

39. A method according to claim 33, wherein the controlling step comprises controlling at least one parameter selected from at least one of:
- a velocity of the moving fluid stream;
- a direction of the moving fluid stream;
- a height of the moving fluid stream;
- a pulse frequency of the moving fluid stream; and
- combinations thereof.

40. A method according to claim 33, further comprising locating a geographical location of at least one of the plurality of plants so as to map the geographical location of the application of the simulated wind force within the agricultural environment.

41. A method according to claim 33, further comprising storing at least one of:
- a geographical location of at least one of the plurality of plants;
- a geographical location of the application of the simulated wind force;
- the at least one parameter of the moving fluid stream;
- an environmental condition;
- a characteristic of at least one of the plurality of plants; and
- combinations thereof.

42. A method according to claim 34, wherein said providing step further comprises providing an adjustable subframe operably engaged between said generating device, said directing device, and said controller, the method further comprising adjusting a height of the adjustable subframe in relation to the vehicle such that said generating device, said directing device and said controller may be raised and lowered in relation to the plurality of plants.

43. A method according to claim 42, wherein said controlling step further comprises controlling said adjustable subframe such that said generating device, said directing device, and said controller may be raised and lowered in relation to the plurality of plants.

44. A method according to claim 33, wherein the wind-resistant physical characteristic is at least one of:
- a root lodging factor;
- a stalk lodging factor;
- a brittle stem break factor; and
- combinations thereof.

45. A method according to claim 33, further comprising determining if the at least one of the plurality of plants exhibits the wind resistant physical characteristic.

46. A method according to claim 33, further comprising selecting the at least one of the plurality of plants for the wind resistant physical characteristic.

47. A method according to claim 46, wherein the selecting step further comprises comparing the wind resistant physical trait of the at least one of the plurality of plants to a known wind resistant physical trait of at least one reference plant.

* * * * *